United States Patent
Chen et al.

(10) Patent No.: US 10,701,366 B2
(45) Date of Patent: Jun. 30, 2020

(54) DERIVING MOTION VECTOR INFORMATION AT A VIDEO DECODER

(71) Applicant: QUALCOMM Incorporated, San Diego, CA (US)

(72) Inventors: Yi-Wen Chen, San Diego, CA (US); Wei-Jung Chien, San Diego, CA (US); Hsiao-Chiang Chuang, San Diego, CA (US); Jianle Chen, San Diego, CA (US); Xiang Li, San Diego, CA (US); Marta Karczewicz, San Diego, CA (US); Yu-Chen Sun, Bellevue, WA (US)

(73) Assignee: Qualcomm Incorporated, San Diego, CA (US)

( * ) Notice: Subject to any disclaimer, the term of this patent is extended or adjusted under 35 U.S.C. 154(b) by 149 days.

(21) Appl. No.: 15/900,649

(22) Filed: Feb. 20, 2018

(65) Prior Publication Data

US 2018/0241998 A1    Aug. 23, 2018

Related U.S. Application Data

(60) Provisional application No. 62/463,266, filed on Feb. 24, 2017, provisional application No. 62/472,919, (Continued)

(51) Int. Cl.
*H04N 7/12* (2006.01)
*H04N 19/139* (2014.01)
(Continued)

(52) U.S. Cl.
CPC ......... *H04N 19/139* (2014.11); *H04N 19/105* (2014.11); *H04N 19/109* (2014.11);
(Continued)

(58) Field of Classification Search
CPC .. H04N 19/139; H04N 19/182; H04N 19/176; H04N 19/124; H04N 19/513;
(Continued)

(56) References Cited

U.S. PATENT DOCUMENTS 6,539,058 B1\* 3/2003 Pearlstein ............... H04N 19/51
375/240.25
2019/0230350 A1\* 7/2019 Chen .................... H04N 19/105

FOREIGN PATENT DOCUMENTS

WO    2009126260 A1    10/2009
WO    2011002809 A2    1/2011

OTHER PUBLICATIONS

Huang Y-W., et al., "TE1: Decoder-Side Motion Vector Derivation with Switchable Template Matching", 2. JCT-VC Meeting; Jul. 21, 2010-Jul. 28, 2010; Geneva; (Joint Collaborative team on Video Coding of ISO/IEC JTC1/SC29/WG11 and ITU-T SG.16); URL:http://wftp3.itu.int/av-arch/jctvc-site/, No. JCTVC-B076, Jul. 23, 2010 (Jul. 23, 2010), pp. 10-11, XP030007656.
(Continued)

*Primary Examiner* — Richard T Torrente
(74) *Attorney, Agent, or Firm* — Shumaker & Sieffert, P.A.

(57) ABSTRACT

An example device for decoding video data includes a memory configured to store video data, and a video decoder implemented in circuitry and configured to determine that motion information of a current block of the video data is to be derived using decoder-side motion vector derivation (DMVD), determine a pixels clue for the current block, the pixels clue comprising pixel data obtained from one or more groups of previously decoded pixels, derive the motion information for the current block according to DMVD from the pixels clue, and decode the current block using the motion information. The video decoder may generate the pixels clue using multiple hypothesis predictions from mul-
(Continued)

tiple motion compensated blocks. The video decoder may determine an inter-prediction direction for the motion information according to matching costs between different prediction directions. The video decoder may refine the motion information using a calculated matching cost for the pixels clue.

38 Claims, 24 Drawing Sheets

Related U.S. Application Data filed on Mar. 17, 2017, provisional application No. 62/461,729, filed on Feb. 21, 2017.

(51) Int. Cl.

| | | |
|---|---|---|
| *H04N 19/182* | (2014.01) | |
| *H04N 19/176* | (2014.01) | |
| *H04N 19/124* | (2014.01) | |
| *H04N 19/513* | (2014.01) | |
| *H04N 19/577* | (2014.01) | |
| *H04N 19/117* | (2014.01) | |
| *H04N 19/105* | (2014.01) | |
| *H04N 19/573* | (2014.01) | |
| *H04N 19/44* | (2014.01) | |
| *H04N 19/109* | (2014.01) | |
| *H04N 19/51* | (2014.01) | |
| *H04N 19/583* | (2014.01) | |

(52) U.S. Cl.
CPC ......... *H04N 19/117* (2014.11); *H04N 19/124* (2014.11); *H04N 19/176* (2014.11); *H04N 19/182* (2014.11); *H04N 19/44* (2014.11); *H04N 19/51* (2014.11); *H04N 19/513* (2014.11); *H04N 19/573* (2014.11); *H04N 19/577* (2014.11); *H04N 19/583* (2014.11)

(58) Field of Classification Search
CPC .. H04N 19/577; H04N 19/117; H04N 19/105; H04N 19/51; H04N 19/109; H04N 19/44; H04N 19/583; H04N 19/573
See application file for complete search history.

(56) References Cited

OTHER PUBLICATIONS

International Search Report and Written Opinion—PCT/US2018/019018—ISA/EPO—dated May 16, 2018.
Lin Y., et al., "Enhanced Template Matching in FRUC Mode", 5. JVET Meeting; Jan. 12, 2017-Jan. 20, 2017; Geneva; (The Joint Video Exploration Team of ISO/IEC JTC1/SC29/WG11 and ITU-T SG.16); URL: http://phenix.int-evry.fr/jvet/, No. JVET-E0035-v2, Jan. 11, 2017 (Jan. 11, 2017), pp. 1-4, XP030150503.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Wang et al., "High Efficiency Video Coding (HEVC) Defect Report," Joint Collaborative Team on Video Coding (JCT-VC)of ITU-T SG 16 WP 3 and ISO/IEC JTC 1/SC 29/WG 11, JCTVC-N1003-v1, 14th Meeting: Vienna, AT, Jul. 25-Aug. 2, 2013, 311 pp.
Chen J., et al., Algorithm Description of Joint Exploration Test Model 5 (JEM 5) Joint Video Exploration Team (JVET) of ITU-T SG 16 WP 3 and ISO/IEC JTC 1/SC 29/WG 11, 5th Meeting: Geneva, Jan. 12-20, 2017, JVET-E1001-v2, 44 Pages.
ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pp.
Sullivan G.J., et al., "Overview of the High Efficiency Video Coding (HEVC) Standard", IEEE Transactions on circuits and Systems for Video Technology, vol. 22, No. 12, Dec. 1, 2012 (Dec. 1, 2012), XP55388661, USA ISSN: 1051-8215, DOI: 10.1109/TCSVT.2012. 2221191, pp. 1649-1668.
He, et al., "Guilded Image Filtering," IEEE Transactions on Pattern Analysis and Machine Intelligence, vol. 35, No. 6, Jun. 2013, 13 pp.
"Bilateral Filter", Wikipedia, the free encyclopedia, accessed on Dec. 21, 2017, retrieved from https://en.wikipedia.org/wiki/Bilateral_filter, 4 pp.
"Sum of absolute transformed differences," Wikipedia, the free encyclopedia, accessed on Dec. 21, 2017, retrieved from https://en.wikipedia.org/wiki/Sum_of_absolute_transformed_differences, 1 pp.
Lin, et al., "Enhanced Template Matching in FRUC Mode," Joint Video Exploration Team (JVET) of ITU-T SG 16 WP 3 and ISO/IEC JTC 1/SC 29/WG 11, No. JVET-E0035, Jan. 12-20, 2017, 5th Meeting; Geneva, CH, Jan. 2, 2017, 4 pp.

\* cited by examiner

DERIVING MOTION VECTOR INFORMATION AT A VIDEO DECODER

This application claims the benefit of U.S. Provisional Application No. 62/461,729, filed Feb. 21, 2017; U.S. Provisional Application No. 62/463,266, filed Feb. 24, 2017; and U.S. Provisional Application No. 62/472,919, filed Mar. 17, 2017, the entire contents of each of which are hereby incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by ITU-T H.261, ISO/IEC MPEG-1 Visual, ITU-T H.262 or ISO/IEC MPEG-2 Visual, ITU-T H.263, ITU-T H.264/MPEG-4, Part 10, Advanced Video Coding (AVC), ITU-T H.265/High Efficiency Video Coding (HEVC), and extensions of such standards, such as Scalable Video Coding (SVC) and Multi-view Video Coding (MVC) extensions. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques related to decoder-side motion vector derivation (DMVD). These techniques may be applied to any of the existing video codecs, such as HEVC (High Efficiency Video Coding), and/or may be an efficient coding tool in any future video coding standards.

In one example, a method of decoding video data includes determining that motion information of a current block of video data is to be derived using decoder-side motion vector derivation (DMVD), determining a pixels clue for the current block, the pixels clue comprising pixel data obtained from one or more groups of previously decoded pixels, deriving the motion information for the current block according to DMVD from the pixels clue, and decoding the current block using the motion information.

In another example, a device for decoding video data includes a memory configured to store video data, and a video decoder implemented in circuitry and configured to determine that motion information of a current block of the video data is to be derived using decoder-side motion vector derivation (DMVD), determine a pixels clue for the current block, the pixels clue comprising pixel data obtained from one or more groups of previously decoded pixels, derive the motion information for the current block according to DMVD from the pixels clue, and decode the current block using the motion information.

In another example, a device for decoding video data includes means for determining that motion information of a current block of video data is to be derived using decoder-side motion vector derivation (DMVD), means for determining a pixels clue for the current block, the pixels clue comprising pixel data obtained from one or more groups of previously decoded pixels, means for deriving the motion information for the current block according to DMVD from the pixels clue, and means for decoding the current block using the motion information.

In another example, a computer-readable storage medium has stored thereon instructions that, when executed, cause a processor to determine that motion information of a current block of video data is to be derived using decoder-side motion vector derivation (DMVD), determine a pixels clue for the current block, the pixels clue comprising pixel data obtained from one or more groups of previously decoded pixels, derive the motion information for the current block according to DMVD from the pixels clue, and decode the current block using the motion information.

The details of one or more examples are set forth in the accompanying drawings and the description below. Other features, objects, and advantages will be apparent from the description and drawings, and from the claims.

DETAILED DESCRIPTION

Figure 1:
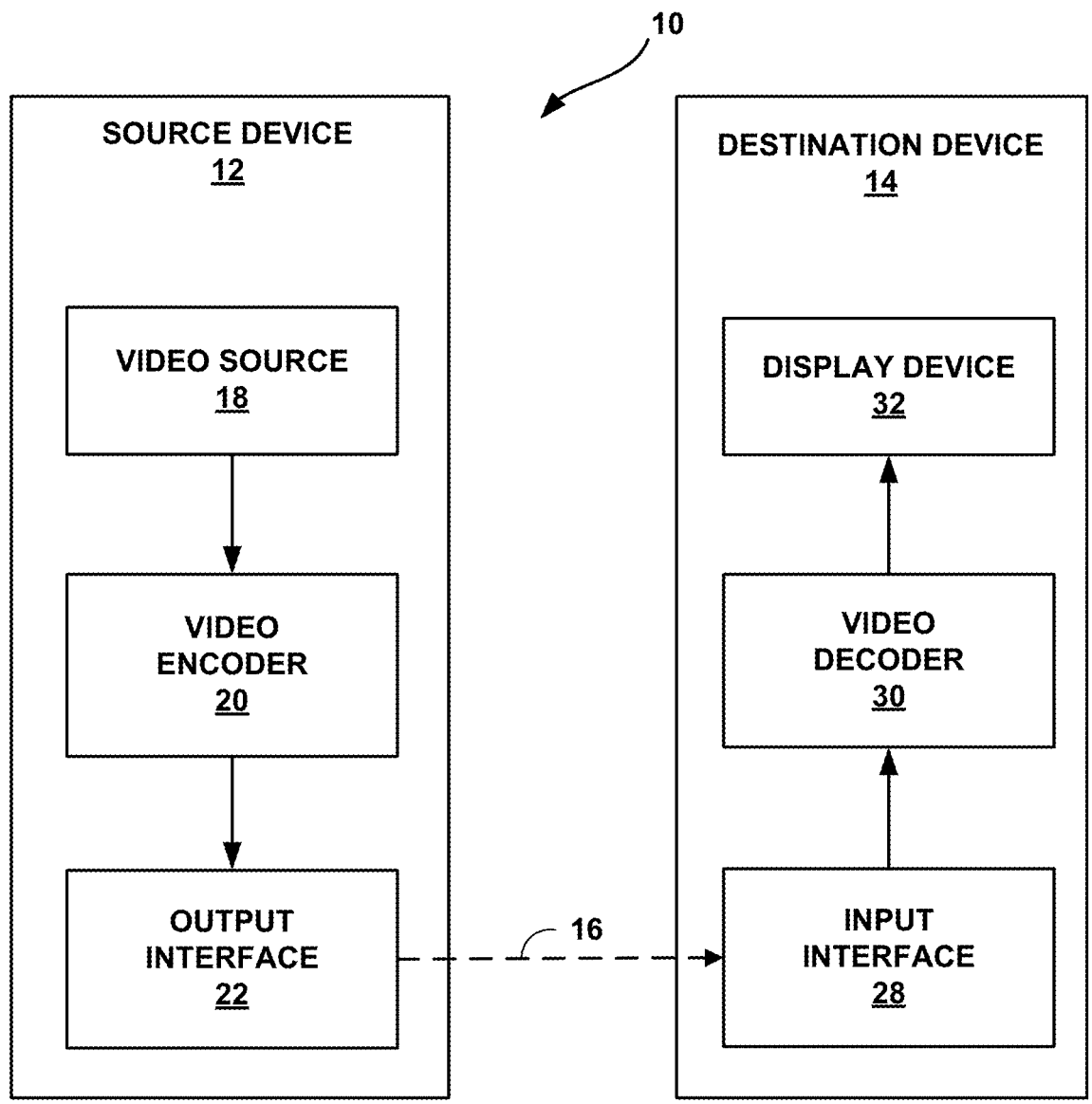
FIG. 1 is a block diagram illustrating an example video encoding and decoding system that may utilize techniques for performing decoder-side motion vector derivation (DMVD) of this disclosure.

In general, the techniques of this disclosure relate to decoder-side motion vector derivation (DMVD). That is, rather than explicitly signaling a motion vector or other motion information, a video decoder may derive the motion vector according to any or all of the techniques of this disclosure, alone or in any combination.

In general, a video decoder may derive motion information for a current block of video data, that is, a block currently being decoded. To derive the motion information, the video decoder may first determine a pixels clue for the current block. The pixels clue generally corresponds to pixel data obtained from one or more groups of previously decoded pixels. The pixels clue may be, for example, one or more blocks that have a high likelihood of being identified by a motion vector. The video decoder may determine such blocks according to bilateral template matching. Additionally or alternatively, the video decoder may determine such blocks from neighboring pixels to the current block and closest matching neighboring pixels to reference blocks, such that the reference blocks form the pixels clue.

In some examples, the video decoder may generate the pixels clue using multiple hypothesis predictions from multiple motion compensated blocks. For example, the video decoder may calculate a weighted average of the multiple motion compensated blocks. Additionally or alternatively, the video decoder may perform overlapped block motion compensation to generate the pixels clue. As yet another example, the video decoder may add offsets to one or more motion vectors of the current block, and derive the multiple motion compensated blocks from the offset motion vectors (as well as the original motion vectors of the current block).

In some examples, the video decoder may calculate a matching cost between a first reference block and a second reference block identified by derived motion information for the current block. The video decoder may calculate the matching cost by applying respective weight values to cost measurements for corresponding pixels of the reference blocks, e.g., a first weight for a first cost measurement and a second weight for a second cost measurement, where the weights and cost measurements may be different from each other. The video decoder may then refine the motion information based on the matching cost. Furthermore, the video decoder may determine the weights based on distances between the corresponding pixels and specific points of the current block, distances between the corresponding pixels and specific points of the pixels clue, a row or column that includes the corresponding pixels, and/or regions that include the correspond pixels.

A new video coding standard, named High Efficiency Video Coding (HEVC) (also referred to as ITU-T H.265), including its range extension, multiview extension (MV-HEVC), and scalable extension (SHVC), has recently been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). The HEVC specification, referred to as HEVC WD hereinafter, is available from phenix.int-evry.fr/jct/doc_end user/documents/14_Vienna/wg11/JCTVC-N1003-v1.zip.

Members of ITU-T VCEG (Q6/16) and ISO/IEC MPEG (JTC 1/SC 29/WG 11) are studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET first met during 19-21 Oct. 2015. A version of reference software, i.e., Joint Exploration Model 5 (JEM 5), is available at jvet.hhi.fraunhofer.de/svn/svn-_HMJEMSoftware/tags/HM-16.6-JEM-5.0. An algorithm description of JEM 5 is available at phenix.it-sudparis.eu/jvet/doc_end_user/current_document.php?id=2714.

In HEVC, the largest coding unit in a slice is called a coding tree block (CTB) or coding tree unit (CTU). A CTB contains a quad-tree the nodes of which are coding units. The size of a CTB can be in a range from 16×16 to 64×64 in the HEVC main profile (although technically 8×8 CTB sizes can be supported). A coding unit (CU) could be the same size of a CTB although and as small as 8×8. Each coding unit is coded with one mode. When a CU is inter coded, it may be further partitioned into 2 or 4 prediction units (PUs) or become just one PU when further partition doesn't apply. When two PUs are present in one CU, they can be half size rectangles or two rectangle size with ¼ or ¾ size of the CU. When the CU is inter-coded, one set of motion information is present for each PU. In addition, each PU is coded with a unique inter-prediction mode to derive the set of motion information.

In the HEVC standard, there are two inter prediction modes, named merge (skip is considered as a special case of merge) and advanced motion vector prediction (AMVP) modes respectively for a prediction unit (PU). In either AMVP or merge mode, a motion vector (MV) candidate list is maintained for multiple motion vector predictors. The motion vector(s), as well as reference indices in the merge mode, of the current PU are generated by taking one candidate from the MV candidate list.

The MV candidate list contains up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode for each potential prediction direction from either list 0 or list 1, a reference index needs to be explicitly signaled, together with an MV predictor (MVP) index to the MV candidate list since the AMVP candidate contains only a motion vector. In AMVP mode, the predicted motion vectors can be further refined. As can be seen above, a merge candidate corresponds to a full set of motion information while an AMVP candidate contains just one motion vector for a specific prediction direction and reference index. The candidates for both modes are derived similarly from the same spatial and temporal neighboring blocks.

FIG. 1 is a block diagram illustrating an example video encoding and decoding system 10 that may utilize techniques for performing decoder-side motion vector derivation (DMVD) of this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for performing decoder-side motion vector derivation (DMVD) of this disclosure. In other examples, a source device and a destination device may include other components or arrangements. For example, source device 12 may receive video data from an external video source 18, such as an external camera.

Likewise, destination device 14 may interface with an external display device, rather than including an integrated display device.

The illustrated system 10 of FIG. 1 is merely one example. Techniques for performing decoder-side motion vector derivation (DMVD) of this disclosure may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard, also referred to as ITU-T H.265. Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, processing circuitry (including fixed function circuitry and/or programmable processing circuitry), digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In general, according to ITU-T H.265, a video picture may be divided into a sequence of coding tree units (CTUs) (or largest coding units (LCUs)) that may include both luma and chroma samples. Alternatively, CTUs may include monochrome data (i.e., only luma samples). Syntax data within a bitstream may define a size for the CTU, which is a largest coding unit in terms of the number of pixels. A slice includes a number of consecutive CTUs in coding order. A video picture may be partitioned into one or more slices. Each CTU may be split into coding units (CUs) according to a quadtree. In general, a quadtree data structure includes one node per CU, with a root node corresponding to the CTU. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a CTU may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a CTU may be split, referred to as a maximum CU depth, and may also define a minimum size of the coding nodes. Accordingly, a bitstream may also define a smallest coding unit (SCU). This disclosure uses the term "block" to refer to any of a CU, prediction unit (PU), or transform unit (TU), in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and is generally square in shape. The size of the CU may range from 8×8 pixels up to the size of the CTU with a maximum size, e.g., 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs (or partitions of a CU) within a given CU defined for a partitioned CTU, although this may not always be the case. The TUs are typically the same size or smaller than the PUs (or partitions of a CU, e.g., in the case of intra prediction). In some examples, residual samples corresponding to a CU may be subdivided into smaller units using a quadtree structure known as a "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs) when predicted using inter-prediction. In general, a PU represents a spatial area corresponding to all or a portion of the corresponding CU, and may include data for retrieving and/or generating a reference sample for the PU. Moreover, a PU includes data related to prediction. When the CU is inter-mode encoded, one or more PUs of the CU may include data defining motion information, such as one or more motion vectors, or the PUs may be skip mode coded. Data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0 or List 1) for the motion vector.

Leaf-CUs may also be intra-mode predicted. In general, intra prediction involves predicting a leaf-CU (or partitions thereof) using an intra-mode. A video coder may select a set of neighboring, previously coded pixels to the leaf-CU to use to predict the leaf-CU (or partitions thereof).

A leaf-CU may also include one or more transform units (TUs). The transform units may be specified using an RQT (also referred to as a TU quadtree structure), as discussed above. For example, a split flag may indicate whether a leaf-CU is split into four transform units. Then, each TU may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, partitions of a CU, or the CU itself, may be collocated with a corresponding leaf-TU for the CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a CTU (or LCU). TUs of the RQT that are not split are referred to as leaf-TUs. In general, this disclosure uses the terms CU and TU to refer to leaf-CU and leaf-TU, respectively, unless noted otherwise.

Although certain techniques are explained with respect to HEVC, it should be understood that the techniques of this disclosure are not limited to HEVC. For example, rather than using quadtree partitioning according to HEVC, the techniques of this disclosure may be applied when CTUs are partitioned according to other partitioning schemes, such as quadtree binary tree (QTBT) partitioning, where a tree data structure may include a region tree partitioned according to quadtree partitioning, and leaf nodes of the region tree may serve as root nodes of respective prediction trees that may be partitioned according to binary tree and/or center-side-triple tree partitioning.

A video sequence typically includes a series of video frames or pictures, starting with a random access point (RAP) picture. A video sequence may include syntax data in a sequence parameter set (SPS) that characteristics of the video sequence. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, prediction may be performed for PUs of various sizes. Assuming that the size of a particular CU is 2N×2N, intra-prediction may be performed on PU sizes of 2N×2N or N×N, and inter-prediction may be performed on symmetric PU sizes of 2N×2N, 2N×N, N×2N, or N×N. Asymmetric partitioning for inter-prediction may also be performed for PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs to include quantized transform coefficients representative of the residual data for the CU. That is, video encoder 20 may calculate the residual data (in the form of a residual block), transform the residual block to produce a block of transform coefficients, and then quantize the transform coefficients to form quantized transform coefficients. Video encoder 20 may form a TU including the quantized transform coefficients, as well as other syntax information (e.g., splitting information for the TU).

As noted above, following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In general, video decoder 30 performs a substantially similar, albeit reciprocal, process to that performed by video encoder 20 to decode encoded data. For example, video decoder 30 inverse quantizes and inverse transforms coefficients of a received TU to reproduce a residual block. Video decoder 30 uses a signaled prediction mode (intra- or inter-prediction) to form a predicted block. Then video decoder 30 combines the predicted block and the residual block (on a pixel-by-pixel basis) to reproduce the original block. Additional processing may be performed, such as performing a deblocking process to reduce visual artifacts along block boundaries. Furthermore, video decoder 30 may decode syntax elements using CABAC in a manner substantially similar to, albeit reciprocal to, the CABAC encoding process of video encoder 20.

Video encoder 20 may further send syntax data, such as block-based syntax data, picture-based syntax data, and sequence-based syntax data, to video decoder 30, e.g., in a picture header, a block header, a slice header, or other syntax data, such as a sequence parameter set (SPS), picture parameter set (PPS), or video parameter set (VPS).

Video encoder 20 and video decoder 30 each may be implemented as any of a variety of suitable encoder or decoder circuitry, as applicable, such as one or more microprocessors, processing circuitry (including fixed function circuitry and/or programmable processing circuitry), digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

In accordance with the techniques of this disclosure, a video coder, such as video encoder 20 and video decoder 30, may perform DMVD to derive motion information for a current block of video data. In particular, these techniques may include any or all of the following, alone or in any combination.

One of the main concepts of this disclosure is to improve the decoder-side motion vector derivation (DMVD). The techniques are elaborated in several different itemized aspects as discussed below. The following techniques to improve DMVD may be applied individually. Alternatively, any combination of them may be applied.

The concept of DMVD approaches is for the video coder (e.g., video encoder 20 or video decoder 30) to derive motion information, such as motion vectors and prediction directions, using previously decoded information. In current approaches, groups of pixels are first derived, and the motion information is then further derived using the groups of pixels. This disclosure refers to these groups of pixels as the "pixels clue." For example, in FRUC Template Matching, the templates of the current block and the reference blocks are the pixels clue; in FRUC Bilateral matching, the mirror-pairs along the motion trajectories of reference blocks are the pixels clue; in Bilateral Template Matching, the bi-prediction generated template and the reference blocks are the pixels clue; and in BIO, the reference blocks are the pixels clue.

A video coder may apply filters to the pixels clue. The filters can be any de-noise filters such as Guided filter, Bilateral filter, median filter, and so on. The filters can also be any smooth filter such as averaging filter. Moreover, whether a filtering process is applied (or not) to the pixels clue for DMVD approached can be signaled at SPS/PPS/slice header.

The video coder (e.g., video encoder 20 or video decoder 30) may apply any motion refinement methods to the generation of pixels clue. The motion refinement methods may contain but not limited to the existing methods including BIO, FRUC Template matching, FRUC Bilateral Matching. In one example when the pixels clue are generated by multiple motion compensated (MC) blocks, the BIO can be applied to the pixels clue to further improve quality of the pixels clue. For example, in the Bilateral Template Matching approach, the Bilateral Template is generated by the averaging of L0 and L1 MC blocks. The video coder can simply apply BIO to refine the Bilateral Template and use the refined Bilateral Template to perform MV refinements. A fast algorithm can be applied to avoid possible redundant operations. After the Bilateral Template Matching MV refinement, if the MV is identical to the original one, the video coder does not need to perform another BIO and MC. Because the Bilateral Template will be identical to the final predictor, the video coder can directly use the Bilateral Template as the final predictor.

When the pixels clue are generated by motion compensated (MC) blocks, the video coder can further improve the pixels clue using multiple hypothesis predictions such as weighted average of multiple MC blocks. For example, the OBMC can be applied to generate the pixels clue. In another example, the multiple MC blocks can be derived using the motion vectors of current block added by offsets (i.e., +1 or −1) to either the X or Y component of the current MV or both X and Y components of the current MV.

The video coder may improve the pixels clue iteratively using the refined MVs. For example, in Bilateral Template Matching method, after the refined MV is derived, the Bilateral Template can be re-generated using the refined MV and the video coder may perform another MV refinement and the MV refinement iteration can be repeated until some predefined criterion is reached. In one example, the iteration number is fixed and pre-defined for both video encoder 20 and video decoder 30. For example, the MV derivation is iterated for N times (N is fixed and pre-defined) and for each iteration the pixels clue are refined according to the results of previous iterations and the refined pixels clue is then used to perform MV derivation. In another example, the iterations are terminated when the matching cost is smaller than (or equal to) a pre-defined threshold. In yet another example, the iterations are terminated when the matching cost is smaller than (or equal to) a pre-defined threshold or the iteration number reaches a pre-defined number.

Besides the pixels clue of the same color component, the video coder may use the pixels clue of any or all of the other components to perform the MV derivation. Moreover, the pixels clue of the other component can be the reconstructed pixels which are the predicted pixels of the associated signaled residual.

In order to generate reference data, video encoder 20 decodes encoded video data and stores the decoded video data in a decoded picture buffer (DPB), e.g., a portion of memory of video encoder 20. Thus, video encoder 20 may use the data of the DPB for reference when predictively encoding subsequent video data. Because video encoder 20 includes elements for decoding encoded video data, video encoder 20 may be said to include a video decoder.

Video encoder 20 and/or video decoder 30 may derive motion information for a current block of video data, that is, a block currently being decoded. To derive the motion information, video encoder 20 and/or video decoder 30 may first determine a pixels clue for the current block. The pixels clue generally corresponds to pixel data obtained from one or more groups of previously decoded pixels. The pixels clue may be, for example, one or more blocks that have a high likelihood of being identified by a motion vector. Video encoder 20 and/or video decoder 30 may determine such blocks according to bilateral template matching. Additionally or alternatively, video encoder 20 and/or video decoder 30 may determine such blocks from neighboring pixels to the current block and closest matching neighboring pixels to reference blocks, such that the reference blocks form the pixels clue.

In some examples, video encoder 20 and/or video decoder 30 may generate the pixels clue using multiple hypothesis predictions from multiple motion compensated blocks. For example, video encoder 20 and/or video decoder 30 may calculate a weighted average of the multiple motion compensated blocks. Additionally or alternatively, video encoder 20 and/or video decoder 30 may perform overlapped block motion compensation to generate the pixels clue. As yet another example, video encoder 20 and/or video decoder 30 may add offsets to one or more motion vectors of the current block, and derive the multiple motion compensated blocks from the offset motion vectors (as well as the original motion vectors of the current block).

In some examples, video encoder 20 and/or video decoder 30 may calculate a matching cost between a first reference block and a second reference block identified by derived motion information for the current block. Video encoder 20 and/or video decoder 30 may calculate the matching cost by applying respective weight values to cost measurements for corresponding pixels of the reference blocks, e.g., a first weight for a first cost measurement and a second weight for a second cost measurement, where the weights and cost measurements may be different from each other. Video encoder 20 and/or video decoder 30 may then refine the motion information based on the matching cost. Furthermore, video encoder 20 and/or video decoder 30 may determine the weights based on distances between the corresponding pixels and specific points of the current block, distances between the corresponding pixels and specific points of the pixels clue, a row or column that includes the corresponding pixels, and/or regions that include the correspond pixels.

Figure 2:
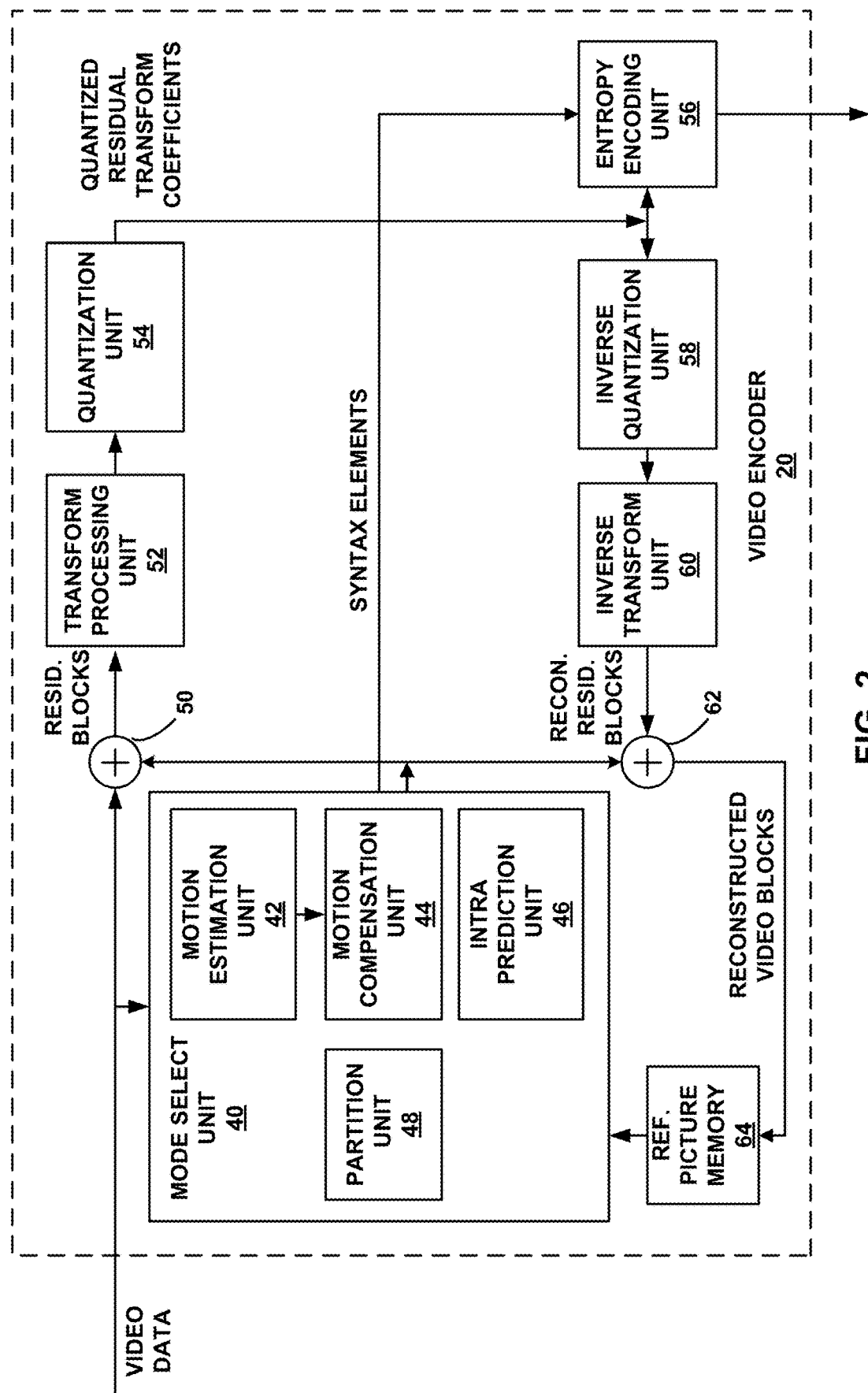
FIG. 2 is a block diagram illustrating an example of a video encoder that may implement techniques for performing decoder-side motion vector derivation (DMVD) of this disclosure.

FIG. 2 is a block diagram illustrating an example of video encoder 20 that may implement techniques for performing decoder-side motion vector derivation (DMVD) of this disclosure. In particular, video encoder 20 may perform the DMVD techniques of this disclosure during a decoding loop, which includes processes performed by inverse quantization unit 58, inverse transform unit 60, and summer 62. Furthermore, as discussed above, video encoder 20 may signal certain values that may assist a video decoder, such as video decoder 30, in performing DMVD.

Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference picture memory 64 (which may also be referred to as a decoded picture buffer (DPB)), summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive encoding of the received video block relative to one or more blocks in one or more reference frames to provide temporal prediction. Intra-prediction unit 46 may alternatively perform intra-predictive encoding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into CTUs, and partition each of the CTUs into sub-CUs based on rate-distortion analysis (e.g., rate-distortion optimization). Mode select unit 40 may further produce a quadtree data structure indicative of partitioning of a CTU into sub-CUs. Leaf-node CUs of the quadtree may include one or more PUs and one or more TUs.

Mode select unit 40 may select one of the prediction modes, intra or inter, e.g., based on error results, and provides the resulting predicted block to summer 50 to generate residual data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

In accordance with the techniques of this disclosure, mode select unit 40 may determine that motion compensation unit 44 is to derive motion information for a current block of video data using decoder-side motion vector derivation techniques. Accordingly, motion compensation unit 44 may use any or all of the techniques of this disclosure, as discussed in greater detail above and below, to generate motion information for the current block. Thus, rather than only using motion information determined by motion estimation unit 42, motion compensation unit 44 may derive motion information for blocks of video data, e.g., using a pixels clue, as discussed herein.

Motion compensation unit 44 may determine the pixels clue from pixel data of one or more groups of pixels of previously decoded pixels, e.g., of previously decoded pictures stored in reference picture memory 64. In some examples, motion compensation unit 44 may generate the pixels clue using multiple hypothesis predictions from multiple motion compensated blocks of the previously decoded pictures.

In some examples, to derive the motion information, motion compensation unit 44 may determine an inter-prediction direction for the motion information according to matching costs between different prediction directions. The inter-prediction direction may generally correspond to whether the derived motion information refers to reference pictures in list0, list1, or both list0 and list1 (i.e., bi-prediction).

In some examples, motion compensation unit 44 may calculate a matching cost between a first reference block and a second reference block. To calculate the matching cost, motion compensation unit 44 may calculate a weighted average of two or more cost measurement techniques. For example, motion compensation unit 44 may perform a first cost measurement of differences between the first and second reference blocks, and then a second, different cost measurement of these differences. Motion compensation unit 44 may then weight the cost measurements, e.g., by applying weighting values to the cost measurements. Motion compensation unit 44 may then accumulate (i.e., add) the weighted cost measurements to obtain a final matching cost, and then refine the motion information using the matching cost.

In some examples, motion compensation unit 44 may determine whether or not to use one or more motion vectors of derived motion information, e.g., based on whether the motion vectors are similar to other motion vector candidates in a motion vector candidate list for a current block. If one or more of the motion vectors are similar enough to an existing motion vector candidate, motion compensation unit 44 may discard the one or more motion vectors.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising transform coefficient values. Wavelet transforms, integer transforms, sub-band transforms, discrete sine transforms (DSTs), or other types of transforms could be used instead of a DCT. In any case, transform processing unit 52 applies the transform to the residual block, producing a block of transform coefficients. The transform may convert the residual information from a pixel domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain. In particular, summer 62 adds the reconstructed residual block to the motion compensated prediction block earlier produced by motion compensation unit 44 or intra-prediction unit 46 to produce a reconstructed video block for storage in reference picture memory 64. The reconstructed video block may be used by motion estimation unit 42 and motion compensation unit 44 as a reference block to inter-code a block in a subsequent video frame.

Figure 3:
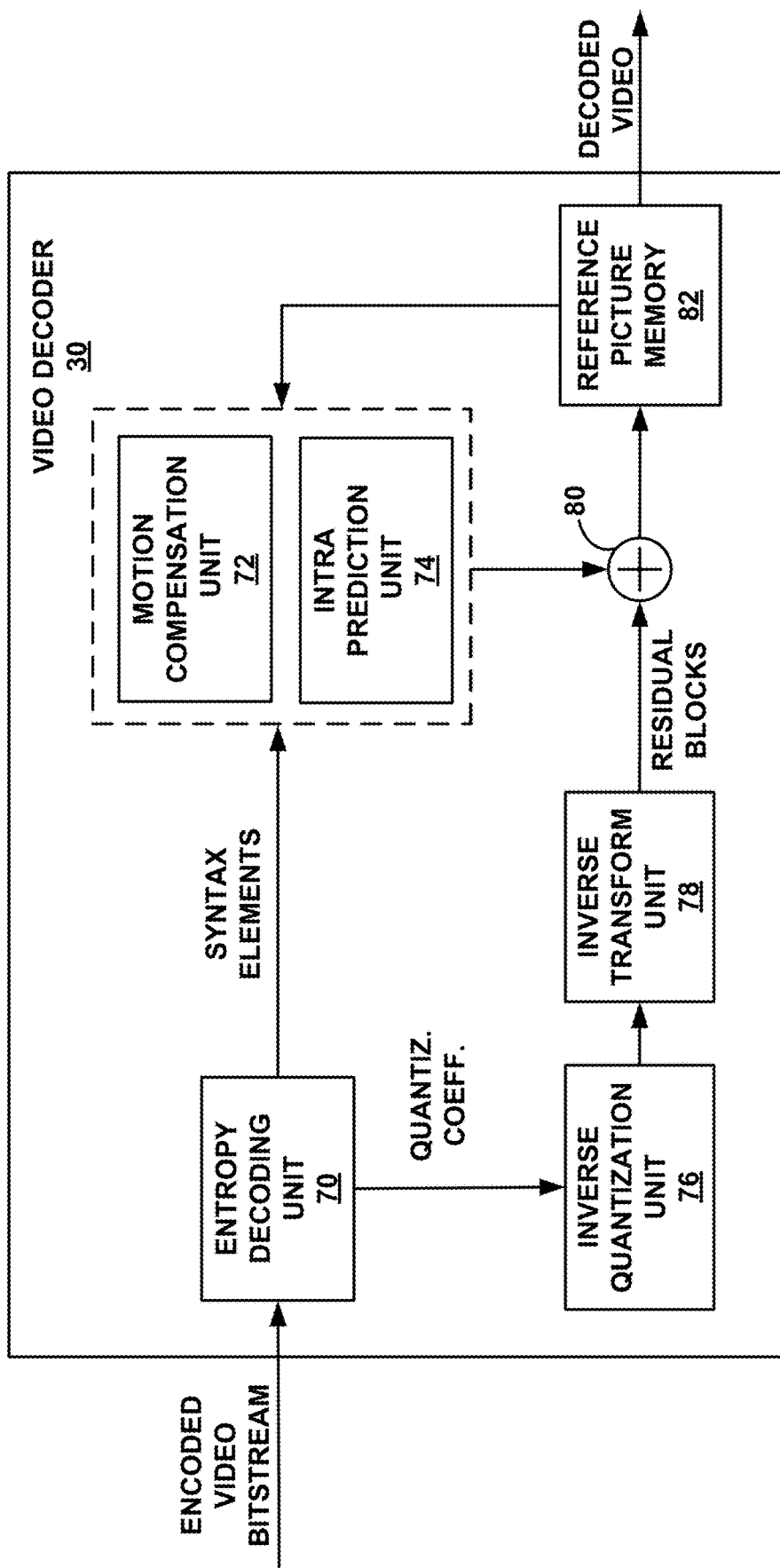
FIG. 3 is a block diagram illustrating an example of a video decoder that may implement techniques for performing decoder-side motion vector derivation (DMVD) of this disclosure.

FIG. 3 is a block diagram illustrating an example of video decoder 30 that may implement techniques for performing decoder-side motion vector derivation (DMVD) of this disclosure. In the example of FIG. 3, video decoder 30 includes an entropy decoding unit 70, motion compensation unit 72, intra prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B or P) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

In accordance with the techniques of this disclosure, motion compensation unit 72 may determine to derive motion information for a current block of video data using decoder-side motion vector derivation techniques. Accordingly, motion compensation unit 72 may use any or all of the techniques of this disclosure, as discussed in greater detail above and below, to generate motion information for the current block. Thus, rather than only using motion information decoded by entropy decoding unit 70, motion compensation unit 72 may derive motion information for blocks of video data, e.g., using a pixels clue, as discussed herein.

Motion compensation unit 72 may determine the pixels clue from pixel data of one or more groups of pixels of previously decoded pixels, e.g., of previously decoded pictures stored in reference picture memory 82. In some examples, motion compensation unit 72 may generate the pixels clue using multiple hypothesis predictions from multiple motion compensated blocks of the previously decoded pictures.

In some examples, to derive the motion information, motion compensation unit 72 may determine an inter-prediction direction for the motion information according to matching costs between different prediction directions. The inter-prediction direction may generally correspond to whether the derived motion information refers to reference pictures in list0, list1, or both list0 and list1 (i.e., bi-prediction).

In some examples, motion compensation unit 72 may calculate a matching cost between a first reference block and a second reference block. To calculate the matching cost, motion compensation unit 72 may calculate a weighted average of two or more cost measurement techniques. For example, motion compensation unit 72 may perform a first cost measurement of differences between the first and second reference blocks, and then a second, different cost measurement of these differences. Motion compensation unit 72 may then weight the cost measurements, e.g., by applying weighting values to the cost measurements. Motion compensation unit 72 may then accumulate (i.e., add) the weighted cost measurements to obtain a final matching cost, and then refine the motion information using the matching cost.

In some examples, motion compensation unit 72 may determine whether or not to use one or more motion vectors of derived motion information, e.g., based on whether the motion vectors are similar to other motion vector candidates in a motion vector candidate list for a current block. If one or more of the motion vectors are similar enough to an existing motion vector candidate, motion compensation unit 72 may discard the one or more motion vectors.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

Figure 4B:
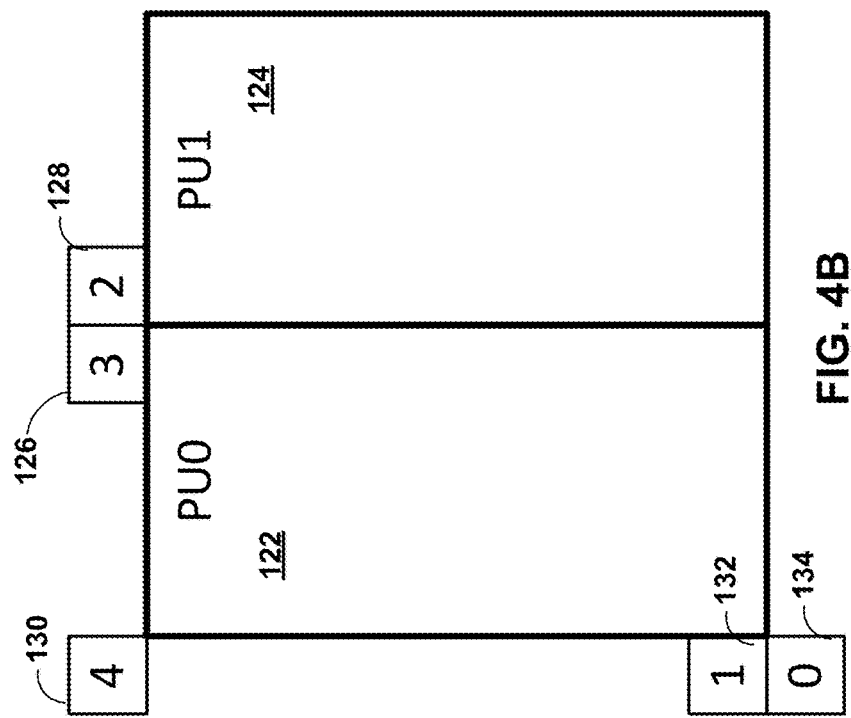
FIGS. 4A and 4B are conceptual diagrams illustrating spatial motion vector candidates derived from neighboring blocks.
Figure 4A:
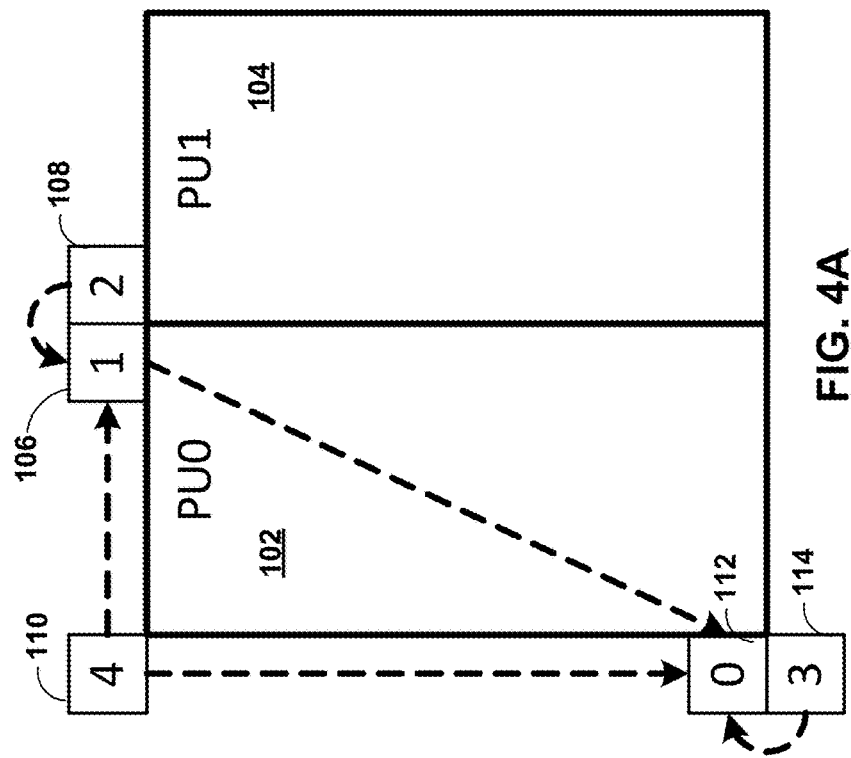

FIGS. 4A and 4B are conceptual diagrams illustrating spatial motion vector candidates derived from neighboring blocks. Video encoder 20 and/or video decoder 30 may derive spatial MV candidates from the neighboring blocks, e.g., as shown in FIGS. 4A and 4B, for a specific PU (e.g., PU0 102 of FIG. 4A and PU0 122 of FIG. 4B, which are included in the same corresponding CUs as PU1 104 and PU1 124, respectively), although the methods for generating the candidates from the blocks differ for merge and AMVP modes. In merge mode, video encoder 20 and/or video decoder 30 may derive up to four spatial MV candidates according to the order shown in FIG. 4A with numbers, as follows: left (block 112), above (block 106), above right (block 108), below left (block 114), and above left (block 110).

In AVMP mode, video encoder 20 and/or video decoder 30 divides the neighboring blocks into two groups: left group (including blocks 132 and 134), and above group (including blocks 130, 126, and 128), as shown in FIG. 4B. For each group, video encoder 20 and/or video decoder 30 determines the potential candidate in a neighboring block referring to the same reference picture as that indicated by the signaled reference index that has the highest priority to form a final candidate of the group. It is possible that no neighboring blocks contain a motion vector pointing to the same reference picture. Therefore, if such a candidate cannot be found, video encoder 20 and/or video decoder 30 may scale the first available candidate to form the final candidate, and thus, the temporal distance differences can be compensated.

Figure 5B:
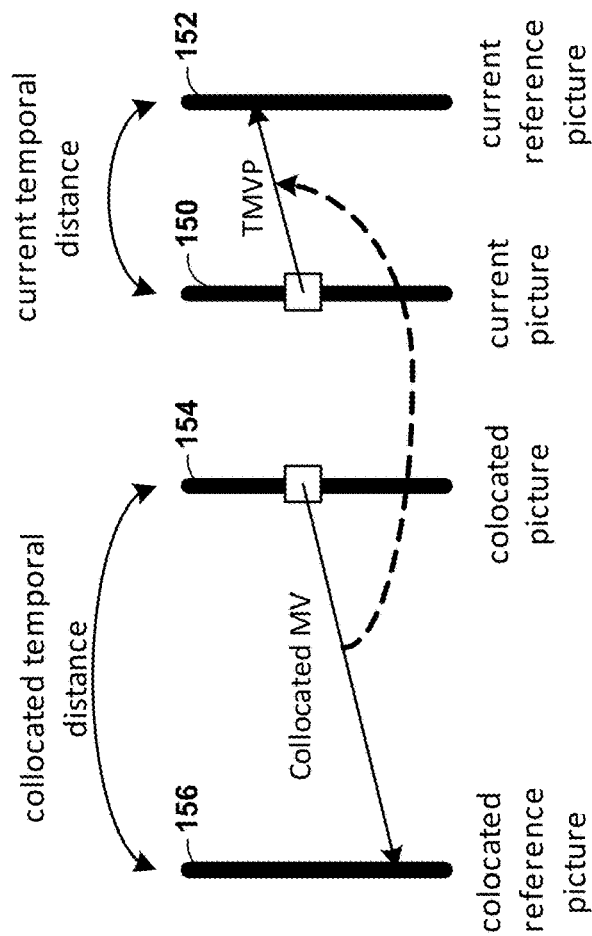
FIGS. 5A and 5B are conceptual diagrams illustrating a primary block location for a temporal motion vector predictor (TMVP) candidate.
Figure 5A:
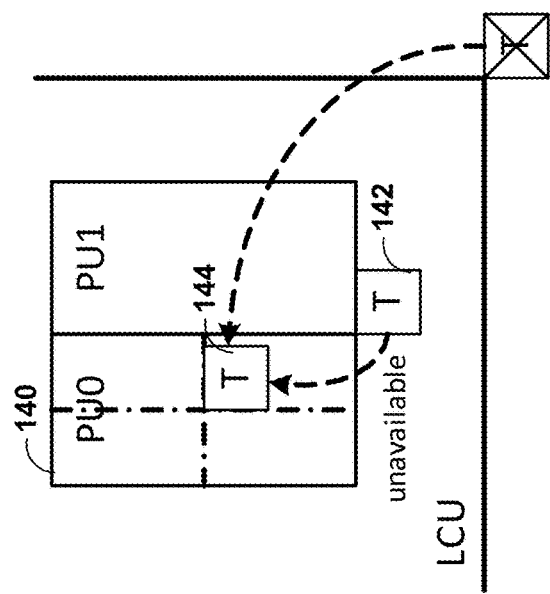

FIGS. 5A and 5B are conceptual diagrams illustrating a primary block location for a temporal motion vector predictor (TMVP) candidate. Video encoder 20 and video decoder 30 may add temporal motion vector predictor (TMVP) candidates, if enabled and available, into the motion vector (MV) candidate list following spatial motion vector candidates in the MV candidate list. The process of motion vector derivation for TMVP candidate is the same for both merge and AMVP modes. However, the target reference index for the TMVP candidate in the merge mode may be set to 0.

The primary block location for TMVP candidate derivation for a PU is the bottom right block outside of the collocated PU, e.g., PU0 140. The primary location for TMVP candidate derivation as shown in FIG. 5A is block "T" 142, to compensate the bias to the above and left blocks used to generate spatial neighboring candidates. However, if that block is located outside of the current CTB row, or motion information is not available, the block is substituted with a center block of the PU, e.g., block 144.

Video encoder 20 and video decoder 30 may derive a motion vector for the TMVP candidate from the co-located PU of the co-located picture, indicated in the slice level. The motion vector for the co-located PU is called collocated MV. Similar to temporal direct mode in AVC, to derive the TMVP candidate motion vector, the co-located MV need to be scaled to compensate the temporal distance differences, as shown in FIG. 5B.

In merge mode and/or AMVP, video encoder 20 and/or video decoder 30 may scale reference motion vectors. FIG. 5B illustrates temporal distances between pictures, e.g., a current temporal distance between current picture 150 and current reference picture 152 and a collocated temporal distance between collocated picture 154 and colocated reference picture 156. It is assumed that the value of motion vectors is proportional to the distance of pictures in the presentation time. A motion vector associates two pictures: the reference picture, and the picture containing the motion vector (namely the containing picture). When video encoder 20 or video decoder 30 uses a motion vector to predict another motion vector, video encoder 20 or video decoder 30 calculates the distance between the containing picture and the reference picture based on the Picture Order Count (POC) values of these pictures.

For a motion vector to be predicted, both its associated containing picture and reference picture may be different. Therefore, video encoder 20 and/or video decoder 30 may calculate a new distance (based on POC). Video encoder 20 and/or video decoder 30 may scale the motion vector based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

In some examples, video encoder 20 and video decoder 30 may perform artificial motion vector candidate generation. If a motion vector candidate list is not complete, video encoder 20 and video decoder 30 may generate artificial motion vector candidates and insert the candidates at the end of the list, until the list has all needed candidates.

In merge mode, there are two types of artificial MV candidates: combined candidate derived only for B-slices and zero candidates used only for AMVP if the first type doesn't provide enough artificial candidates.

For each pair of candidates that are already in the candidate list and have necessary motion information, bi-directional combined motion vector candidates are derived by a combination of the motion vector of the first candidate referring to a picture in the list 0 and the motion vector of a second candidate referring to a picture in the list 1.

In some cases, video encoder 20 and video decoder 30 may perform a pruning process following candidate insertion. Candidates from different blocks may happen to be the same, which decreases the efficiency of a merge/AMVP candidate list. The pruning process may solve this problem. According to the pruning process, video encoder 20 and video decoder 30 may compare one candidate against the others in the current candidate list to avoid identical candidates, to a certain extent. To reduce the complexity, only limited numbers of pruning processes are applied, instead of comparing each potential candidate with all the other existing candidates.

In the JEM reference software, there are several inter coding tools which derive or refine the motion vector (MV) for a current block at the decoder side. These decider-side MV derivation (DMVD) approaches are elaborated as below.

Figure 6:
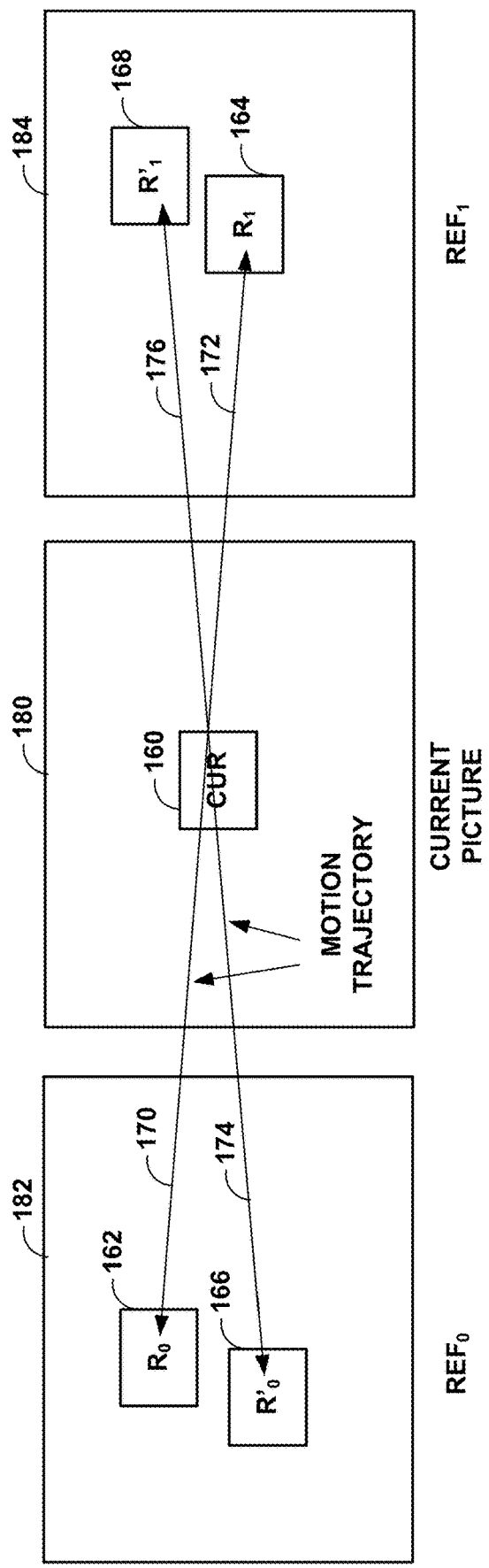
FIG. 6 is a conceptual diagram illustrating concepts related to bilateral matching for deriving motion information of a current block.
Figure 7:
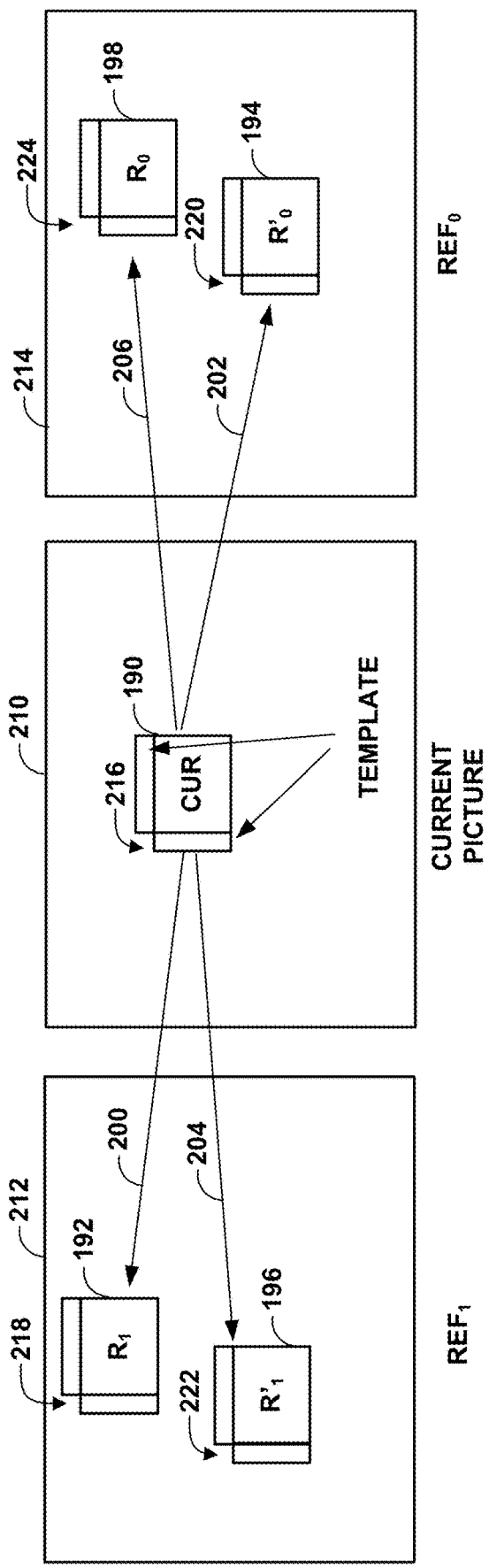
FIG. 7 is a conceptual diagram illustrating concepts related to template matching for deriving motion information of a current block.

FIGS. 6 and 7 are conceptual diagrams illustrating concepts for pattern matched motion vector derivation (PM-MVD). PMMVD mode is a special merge mode based on Frame-Rate Up Conversion (FRUC) techniques. With this mode, motion information of a block is not signaled but derived at decoder side (e.g., during a decoding process performed by video encoder 20 and video decoder 30). This technology was included in JEM.

Video encoder 20 may signal a FRUC flag for a CU when a merge flag of the CU is true. When the FRUC flag is false, video encoder 20 signals a merge index, and the in response to detecting the merge index following a value of false for the FRUC flag, video decoder 30 uses regular merge mode. When the FRUC flag is true, video encoder 20 may signal an additional FRUC mode flag to indicate which method (bilateral matching or template matching) is to be used to derive motion information for the block. Accordingly, video decoder 30 may use the value of false for the FRUC flag to determine that the FRUC mode flag will be present, and determine the FRUC mode from the FRUC mode flag, e.g., bilateral matching or template matching.

During the motion derivation process, video encoder 20 and/or video decoder 30 may first derive an initial motion vector for the whole CU based on bilateral matching or template matching (according to the FRUC mode flag). First, video encoder 20 and/or video decoder 30 may check the merge list of the CU, or called PMMVD seeds, and then select the candidate which leads to the minimum matching cost as the starting point. Then, video encoder 20 and/or video decoder 30 may conduct a local search based on bilateral matching or template matching around the starting point, and select the MV resulting in the minimum matching cost as the MV for the whole CU. Subsequently, video encoder 20 and/or video decoder 30 may further refine the motion information at sub-block level with the derived CU motion vectors as the starting points.

FIG. 6 is a conceptual diagram illustrating concepts related to bilateral matching for deriving motion information of current block 160 in current picture 180. As shown in the FIG. 6, bilateral matching is used to derive motion information of current block 160 by finding the best match between two reference blocks (e.g., between R0 block 162 and R1 block 164, and/or between R'0 block 166 and R'1 block 168) along corresponding motion trajectories of current block 160 in two different reference pictures 182, 184. In particular, motion vector 170 defines a location of R0 block 162 in reference picture 182 relative to the position of current block 160, while motion vector 172 defines a location of R1 block 164 in reference picture 184 relative to the position of current block 160. Similarly, motion vector 174 defines the location of R'0 block 166 in reference picture 182 relative to the position of current block 160, while motion vector 176 defines the location of R'1 block 168 in reference picture 184 relative to the position of current block 160.

According to bilateral matching, motion vectors 170, 172 have magnitudes proportional to POC distances between current picture 180 and reference pictures 182, 184, and motion vector 170 is in an opposite trajectory to motion vector 172. Similarly, motion vectors 174, 176 have magnitudes proportional to POC distances between current picture 180 and reference pictures 182, 184, and motion vector 174 has an opposite trajectory to motion vector 176. That is, if a motion vector has x- and y-components {x0, y0}, a motion vector having an equal magnitude in an opposite directory may be defined by x- and y-components {−x0, −y0}. In other words, under the assumption of continuous motion trajectory, the motion vectors 170, 174 and corresponding motion vectors 172, 176 (respectively) pointing to respective reference blocks shall be proportional to the temporal distances between current picture 180 and reference pictures 182, 184. As a special case, when current picture 180 is temporally between reference pictures 182, 184, and the temporal distance from current picture 180 to reference pictures 182, 184 is the same, the bilateral matching becomes mirror based bi-directional MV.

FIG. 7 is a conceptual diagram illustrating concepts related to template matching for deriving motion information of current block 190. As shown in FIG. 7, template matching is used to derive motion information of current block 190 by finding the best match between a template 216 (including top and/or left neighboring blocks to current block 190) in current picture 210 and one or more of reference templates 218, 220, 222, 224 (each having the same size as template 216) in one or more of reference pictures 212, 214. Video encoder 20 and video decoder 30 may use one of reference blocks 192, 194, 196, 198 to predict current block 190 (according to respective motion vectors 200, 202, 204, 206) for which the corresponding one of reference templates 218, 220, 222, 224 most closely matches template 216. In various examples, video encoder 20 and video decoder 30 may use two of motion vectors 200, 202, 204, 206, e.g., for bi-prediction.

Video encoder 20 may determine whether to use FRUC merge mode for a CU according to a rate-distortion (RD) cost selection, as done for normal merge candidate. That is, video encoder 20 may compare the two matching modes (bilateral matching and template matching) are both checked for a CU by using RD cost selection. Video encoder 20 may select the mode leading to the minimal RD cost, and further compare the RD cost for this mode to costs for other CU modes. If a FRUC matching mode is the most efficient one, video encoder 20 may set the FRUC flag to true for the CU and signal the related matching mode. Likewise, video decoder 30 may determine a prediction mode according to whether the FRUC flag is set to true, and if so, which of bilateral matching or template matching is signaled.

Figure 8:
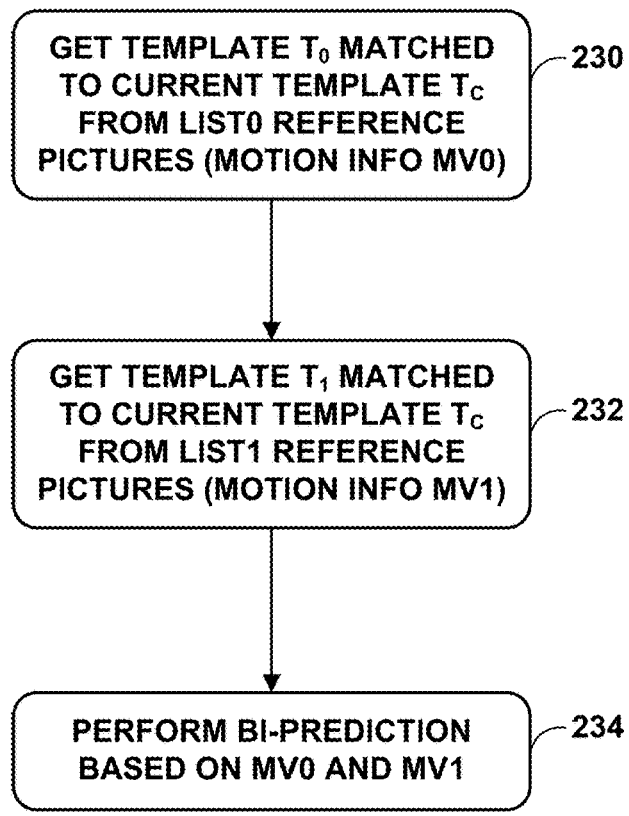
FIG. 8 is a flowchart illustrating an example frame-rate up-conversion (FRUC) template matching process.

FIG. 8 is a flowchart illustrating an example frame-rate up-conversion (FRUC) template matching process. In 5$^{th}$ JVET meeting, JVET-E0035 was proposed to further improve FRUC Template matching. A flowchart of the existing FRUC template matching mode is shown in FIG. 8. In the first step, a template $T_0$ (and its corresponding motion information MV0) is found to match current template Tc of current block from list0 reference pictures (230). In the second step, template $T_1$ (and its corresponding motion information MV1) is found from list1 reference pictures (232). The obtained motion information MV0 and MV1 are used to perform bi-prediction to generate predictor of the current block (234).

Figure 9:
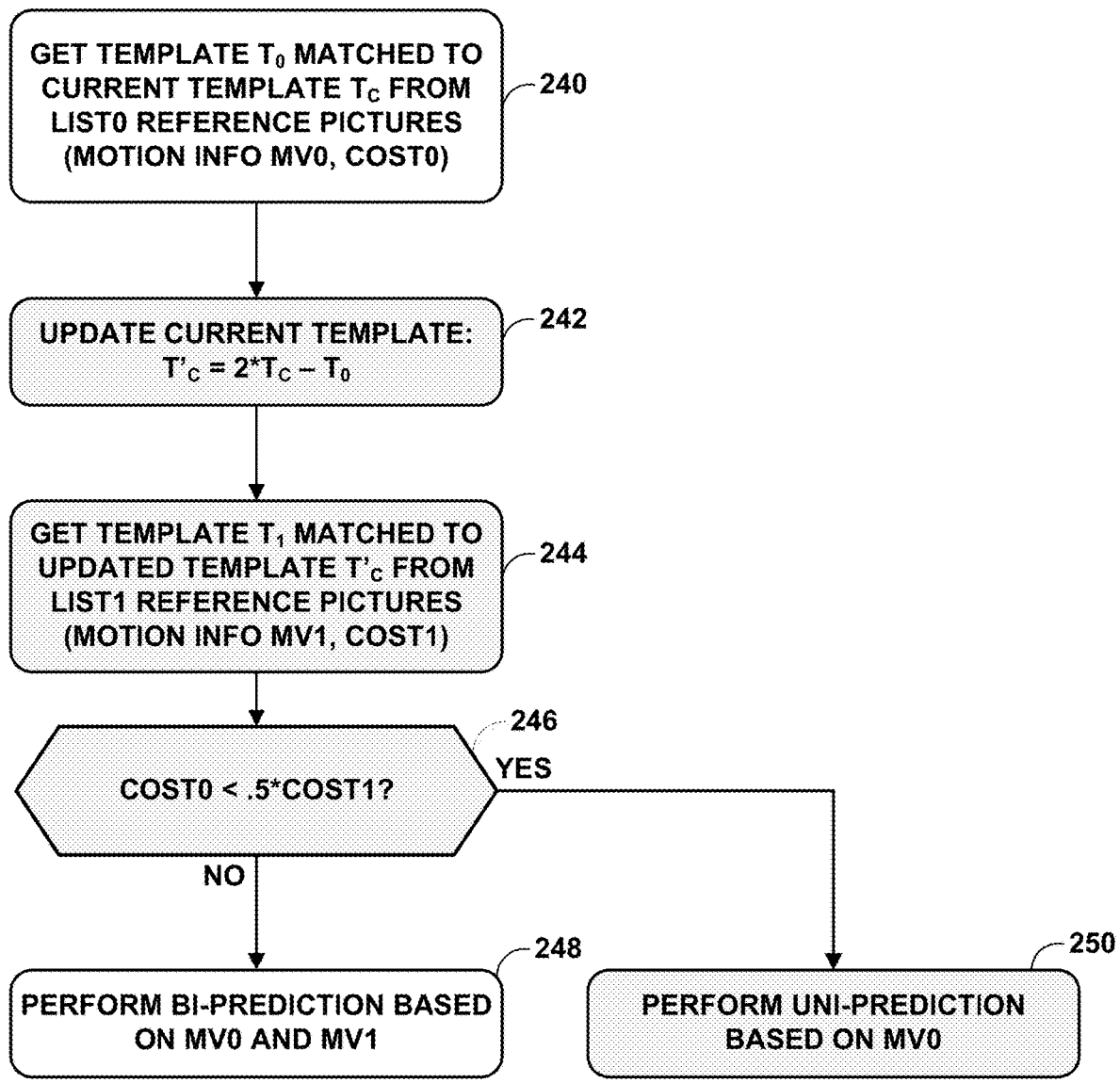
FIG. 9 is a flowchart illustrating example proposed changes to the FRUC template matching process of FIG. 8.

FIG. 9 is a flowchart illustrating example proposed changes to the FRUC template matching process of FIG. 8. Video encoder 20 and/or video decoder 30 may perform the steps of FIG. 9 as shown. The existing FRUC template matching mode may be enhanced by introducing bi-directional template matching and adaptive selection between uni-prediction and bi-prediction. The proposed modifications relative to FIG. 8 are highlighted with light grey shading in FIG. 9.

The proposed bi-directional template matching is implemented based on the existing uni-directional template matching. As shown in FIG. 9, a matched template $T_0$ is firstly found in the first step of template matching from list0 reference pictures (Note that list0 here is only taken as an example) (240). In fact, whether list0 or list1 used in the first step is adaptive to initial distortion cost between current template and initial template in corresponding reference picture. The initial template can be determined with initial motion information of the current block which is available before performing the first template matching. The reference picture list corresponding to minimal initial template distortion cost will be used in the first step of template matching. For example, if initial template distortion cost corresponding to list0 is no larger than cost corresponding to list1, list0 is used in the first step of template matching and list1 is used in the second step), then, the current template $T_C$ of current block is updated (242) as follows:

$$T'_C = 2 * T_C - T_0$$

The updated current template $T'_C$, instead of the current template $T_C$, is used to find another matched template $T_1$ from list1 reference pictures in the second template matching. As a result, the matched template $T_1$ is found by jointly using list0 and list1 reference pictures (244). This matching process is called bi-directional template matching.

The proposed selection between uni-prediction and bi-prediction for motion compensation prediction (MCP) is based on template matching distortion. As shown in FIG. 9, during template matching, distortion between template $T_0$ and $T_C$ (the current template) can be calculated as cost0, and distortion between template $T_1$ and $T'_C$ (the updated current template) can be calculated as cost1. If cost0 is less than 0.5*cost1 ("YES" branch of 246), uni-prediction based on MV0 is applied to FRUC template matching mode (250); otherwise ("NO" branch of 246), bi-prediction based on MV0 and MV1 is applied (248). Note that cost0 is compared to 0.5*cost1 since cost1 indicates difference between template $T_1$ and $T'_C$ (the updated current template), which is 2 times of difference between $T_C$ (the current template) and its prediction of $0.5*(T_0+T_1)$. It is noted that the proposed methods are only applied to PU-level motion refinement. Sub-PU level motion refinement is kept unchanged.

Figure 10:
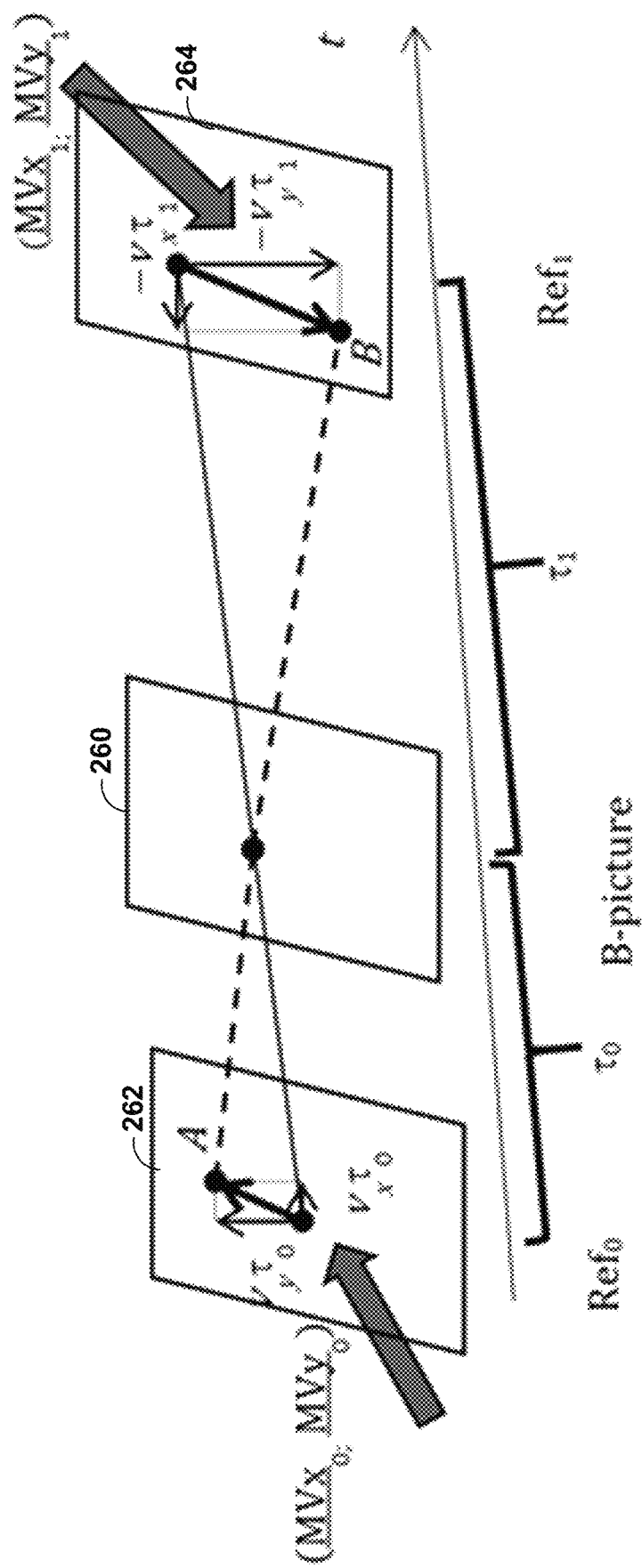
FIG. 10 is a conceptual diagram illustrating concepts related to bi-directional optical flow in the Joint Exploration Model (JEM) for a proposed upcoming video coding standard.

FIG. 10 is a conceptual diagram illustrating concepts related to bi-directional optical flow in JEM. Bi-directional Optical flow (BIO) is pixel-wise motion refinement which is performed on top of block-wise motion compensation in a case of bi-prediction. Since it is used to compensate fine motion inside a block, enabling BIO may result in enlarging block size for motion compensation. Sample-level motion refinement does not require exhaustive search or signaling, since there is an explicit equation that gives fine motion vector for each sample.

Let $I^{(k)}$ be luminance value from reference k (k=0, 1) after block motion compensation, and $\partial I^{(k)}/\partial x$, $\partial I^{(k)}/\partial y$ are horizontal and vertical components of the $I^{(k)}$ gradient respectively. Assuming the optical flow is valid, the motion vector field $(v_x, v_y)$ is given by an equation $$\partial I^{(k)}/\partial t + v_x \partial I^{(k)}/\partial x + v_y^{(k)} \partial y = 0. \qquad (1)$$

Combining optical flow equation with Hermite interpolation for motion trajectory of each sample one gets a unique polynomial of third order which matches both function values $I^{(k)}$ and derivatives $\partial I^{(k)}/\partial x$, $\partial I^{(k)}/\partial y$ at the ends. The value of this polynomial at t=0 is BIO prediction:

$$\text{pred}_{BIO}=1/2\cdot(I^{(0)}+I^{(1)}+v_x/2\cdot(\tau_1\partial I^{(1)}/\partial x - \tau_0\partial I^{(0)}/\partial x)+v_y/2\cdot(\tau_1\partial I^{(1)}/\partial y - \tau_0\partial I^{(0)}/\partial y)). \qquad (2)$$

Here $\tau_0$ and $\tau_1$ denote the distance to reference frames as shown in FIG. 10. Distances $\tau_0$ and $\tau_1$ are calculated using POC values relative to B-picture 260 for Ref0 picture 262 and Ref1 picture 264: $\tau_0$=POC(current)–POC(Ref0), $\tau_1$=POC(Ref1)–POC(current). If both predictions come from the same time direction (both from the past or both from the future) then signs are different $\tau_0\cdot\tau_1<0$. In this case, BIO is applied only if prediction comes not from the same time moment ($\tau_0\neq\tau_1$), both referenced regions have non-zero motion ($MVx_0, MVy_0, MVx_1, MVy_1\neq 0$), and block motion vectors are proportional to the time distance ($MVx_0/MVx_1=MVy_0/MVy_1=-\tau_0/\tau_1$).

The motion vector field $(v_x,v_y)$ is determined by minimizing the difference $\Delta$ between values in points A and B (intersection of motion trajectory and reference frame planes on FIG. 6). Model uses only first linear term of local Taylor expansion for $\Delta$:

$$\Delta=(I^{(0)}-I^{(1)}_0)v_x(\tau_1\partial I^{(1)}/\partial x+\tau_0\partial I^{(0)}/\partial x)+v_y(\tau_1\partial I^{(1)}/\partial y+\tau_0\partial I^{(0)}/\partial y)) \qquad (3)$$

All values in (1) depend on sample location (i',j'), which was omitted so far. Assuming the motion is consistent in local surrounding we minimize $\Delta$ inside $(2M+1)\times(2M+1)$ square window $\Omega$ centered in currently predicted point (i,j):

$$(v_x, v_y) = \underset{v_x,v_y}{\operatorname{argmin}} \sum_{[i',j]\in\Omega} \Delta^2[i', j'] \qquad (4)$$

For this optimization problem, a simplified solution is used, making first minimization in vertical and then in horizontal directions. It results in $$v_x = (s_1 + r) > m\,?\, \operatorname{clip3}\left(-thBIO,\, thBIO,\, -\frac{s_3}{(s_1+r)}\right) : 0 \qquad (5)$$

$$v_y = (s_5 + r) > m\,?\, \operatorname{clip3}\left(-thBIO,\, thBIO,\, -\frac{s_6 - v_x s_2/2}{(s_5+r)}\right) : 0 \qquad (6)$$

where, $$s_1 = \sum_{[i',j]\in\Omega} (\tau_1\partial I^{(1)}/\partial x + \tau_0\partial I^{(0)}/\partial x)^2; \qquad (7)$$

$$s_3 = \sum_{[i',j]\in\Omega} (I^{(1)}-I^{(0)})(\tau_1\partial I^{(1)}/\partial x + \tau_0\partial I^{(0)}/\partial x);$$

$$s_2 = \sum_{[i',j]\in\Omega} (\tau_1\partial I^{(1)}/\partial x + \tau_0\partial I^{(0)}/\partial x)(\tau_1\partial I^{(1)}/\partial y + \tau_0\partial I^{(0)}/\partial y);$$

$$s_5 = \sum_{[i',j]\in\Omega} (\tau_1\partial I^{(1)}/\partial y + \tau_0\partial I^{(0)}/\partial y)^2;$$

$$s_6 = \sum_{[i',j]\in\Omega} (I^{(1)}-I^{(0)})(\tau_1\partial I^{(1)}/\partial y + \tau_0\partial I^{(0)}/\partial y)$$

In order to avoid division by zero or very small value, regularization parameters r and m are introduced in equations (2), (3).

$$r=500\cdot 4^{d-8} \qquad (8)$$

$$m=700\cdot 4^{d-8} \qquad (9)$$

Here d is internal bit-depth of the input video.

In some cases, MV regiment of BIO might be unreliable due to noise or irregular motion. Therefore, in BIO, the magnitude of MV regiment is clipped to a certain threshold thBIO. The threshold value is determined based on whether all the reference pictures of the current picture are all from one direction. If all the reference pictures of the current picture are from one direction, the value of the threshold is set to $12\times 2^{14-d}$, otherwise, it is set to $12\times 2^{13-d}$.

Gradients for BIO are calculated at the same time with motion compensation interpolation using operations consistent with HEVC motion compensation process (2D separable FIR). The input for this 2D separable FIR is the same reference frame sample as for motion compensation process and fractional position (fracX, fracY) according to the fractional part of block motion vector. In case of horizontal gradient $\partial I/\partial x$ signal first interpolated vertically using BIOfilterS corresponding to the fractional position fracY with de-scaling shift d–8, then gradient filter BIOfilterG is applied in horizontal direction corresponding to the fractional positionfracX with de-scaling shift by 18–d. In case of vertical gradient $\partial I/\partial y$ first gradient filter is applied vertically using BIOfilterG corresponding to the fractional position fracY with de-scaling shift d–8, then signal displacement is performed using BIOfilterS in horizontal direction corresponding to the fractional position fracX with de-scaling shift by 18–d. The length of interpolation filter for gradients calculation BIOfilterG and signal displacement BIOfilterF is shorter (6-tap) in order to maintain reasonable complexity. Table 1 shows the filters used for gradients calculation for different fractional positions of block motion vector in BIO. Table 2 shows the interpolation filters used for prediction signal generation in BIO.

Figure 11:
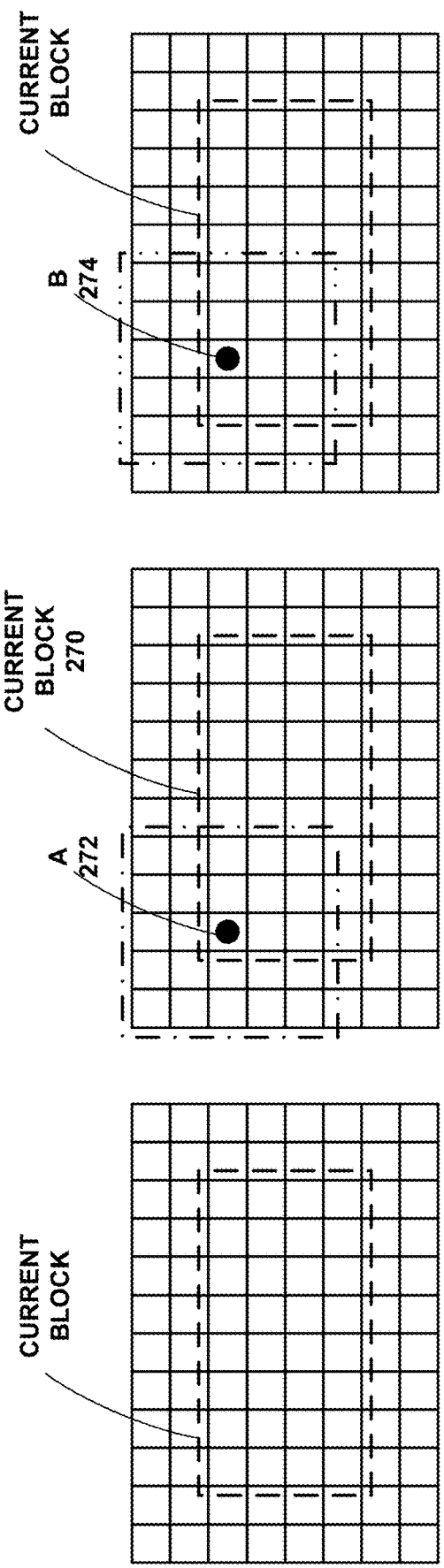
FIG. 11 is a conceptual diagram illustrating an example of gradient calculation for an 8×4 block.

FIG. 11 is a conceptual diagram illustrating an example of gradient calculation for an 8×4 block. For an 8×4 current block 270, a video coder (e.g., video encoder 20 or video decoder 30) fetches the motion compensated predictors and calculates the horizontal/vertical (HOR/VER) gradients of all the pixels within current block 270, as well as the outer two lines of pixels, because solving vx and vy for each pixel needs the HOR/VER gradient values and motion compensated predictors of the pixels within the window $\Omega$ centered in each pixel as shown in equation (4). And in JEM, the size of this window is set to 5×5. Therefore, the video coder fetches the motion compensated predictors and calculates the gradients for the outer two lines of pixels around points A 272 and B 274.

TABLE 1

Filters for gradients calculation in BIO

| Fractional pel position | Interpolation filter for gradient(BIOfilterG) |
|---|---|
| 0 | {8, −39, −3, 46, −17, 5} |
| 1/16 | {8, −32, −13, 50, −18, 5} |
| 1/8 | {7, −27, −20, 54, −19, 5} |
| 3/16 | {6, −21, −29, 57, −18, 5} |
| 1/4 | {4, −17, −36, 60, −15, 4} |
| 5/16 | {3, −9, −44, 61, −15, 4} |
| 3/8 | {1, −4, −48, 61, −13, 3} |
| 7/16 | {0, 1, −54, 60, −9, 2} |
| 1/2 | {1, 4, −57, 57, −4, 1} |

TABLE 2

Interpolation filters for prediction signal generation in BIO

| Fractional pel position | Interpolation filter for prediction signal (BIOfilterS) |
|---|---|
| 0 | {0, 0, 64, 0, 0, 0} |
| 1/16 | {1, −3, 64, 4, −2, 0} |
| 1/8 | {1, −6, 62, 9, −3, 1} |
| 3/16 | {2, −8, 60, 14, −5, 1} |
| 1/4 | {2, −9, 57, 19, −7, 2} |
| 5/16 | {3, −10, 53, 24, −8, 2} |
| 3/8 | {3, −11, 50, 29, −9, 2} |
| 7/16 | {3, −11, 44, 35, −10, 3} |
| 1/2 | {1, −7, 38, 38, −7, 1} |

In JEM, BIO is applied to all bi-directional predicted blocks when the two predictions are from different reference pictures. When LIC is enabled for a CU, BIO is disabled.

Figure 12:
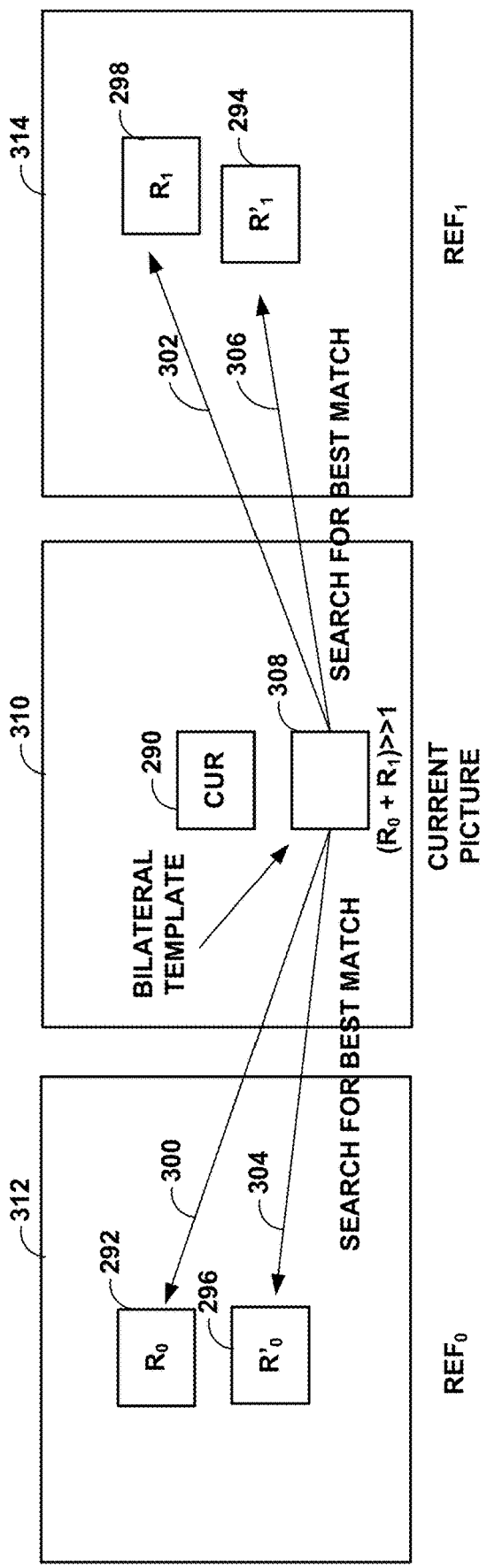
FIG. 12 is a conceptual diagram illustrating concepts related to the proposed decoder-side motion vector derivation (DMVD) based on bilateral template matching.

FIG. 12 is a conceptual diagram illustrating concepts related to the proposed decoder-side motion vector derivation (DMVD) based on bilateral template matching. A video coder (such as video encoder 20 or video decoder 30) may generate bilateral template 308 as the weighted combination of two prediction blocks 292 and 298, from initial MV 300 of list0 and MV 302 of list1, respectively, as shown in FIG. 12.

The video coder (video encoder 20 or video decoder 30) may continue the template matching operation, which includes calculating cost measures between generated template 308 and the sample region (around the initial prediction block) in reference pictures 312, 314. For each of reference pictures 312, 314, the video coder may determine that the MV that yields the minimum template cost is the updated MV of that list to replace the original one. Finally, the video coder uses the two new MVs, i.e., MV 304 and MV 306, as shown in FIG. 12, for regular bi-prediction from corresponding blocks 294, 296. As it is commonly used in block-matching motion estimation, the sum of absolute differences (SAD) may be used as cost measure.

Video encoder 20 and video decoder 30 may apply decoder-side motion vector derivation (DMVD) for merge mode of bi-prediction, with one from the reference picture in the past and the other from reference picture in the future, without the transmission of additional syntax element from video encoder 20 to video decoder 30. In JEM4.0, when LIC, affine, sub-CU merge candidate, or FRUC is selected for one CU, DMVD is not applied.

Figure 13A:
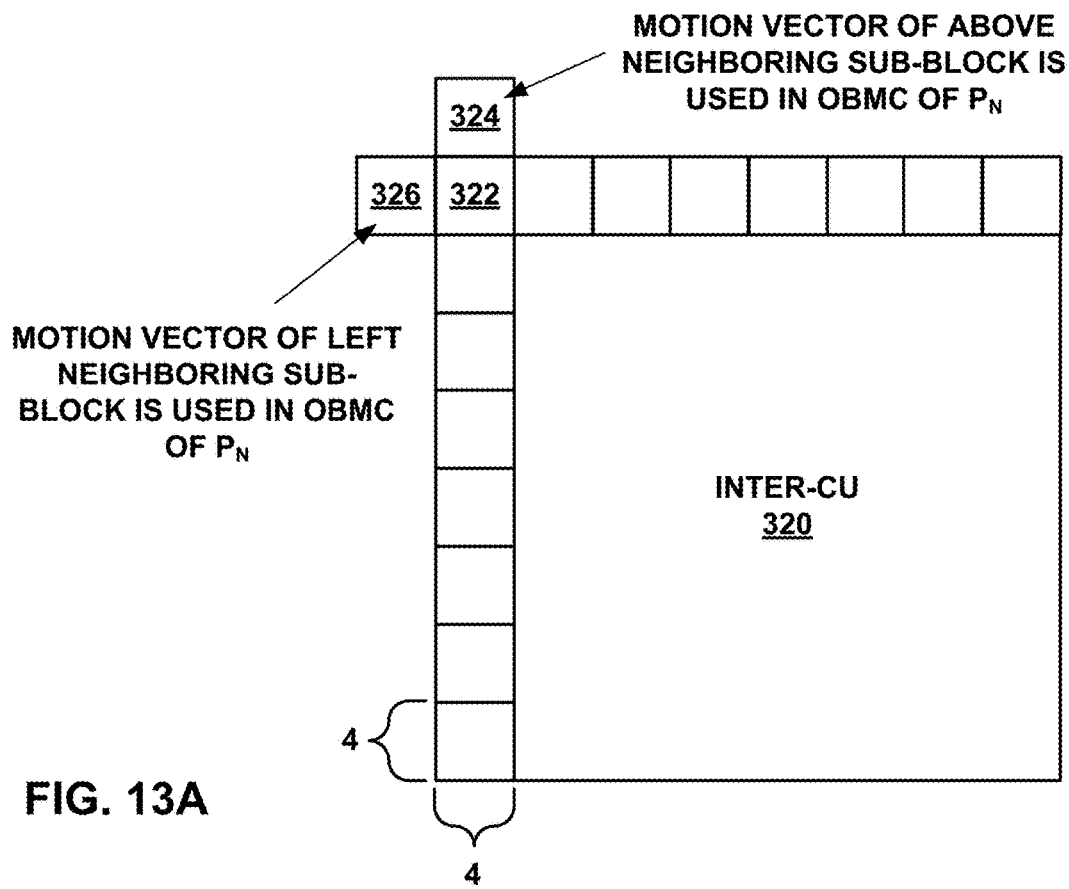
FIGS. 13A and 13B are conceptual diagram illustrating concepts related to overlapped block motion compensation (OBMC) in JEM.
Figure 13B:
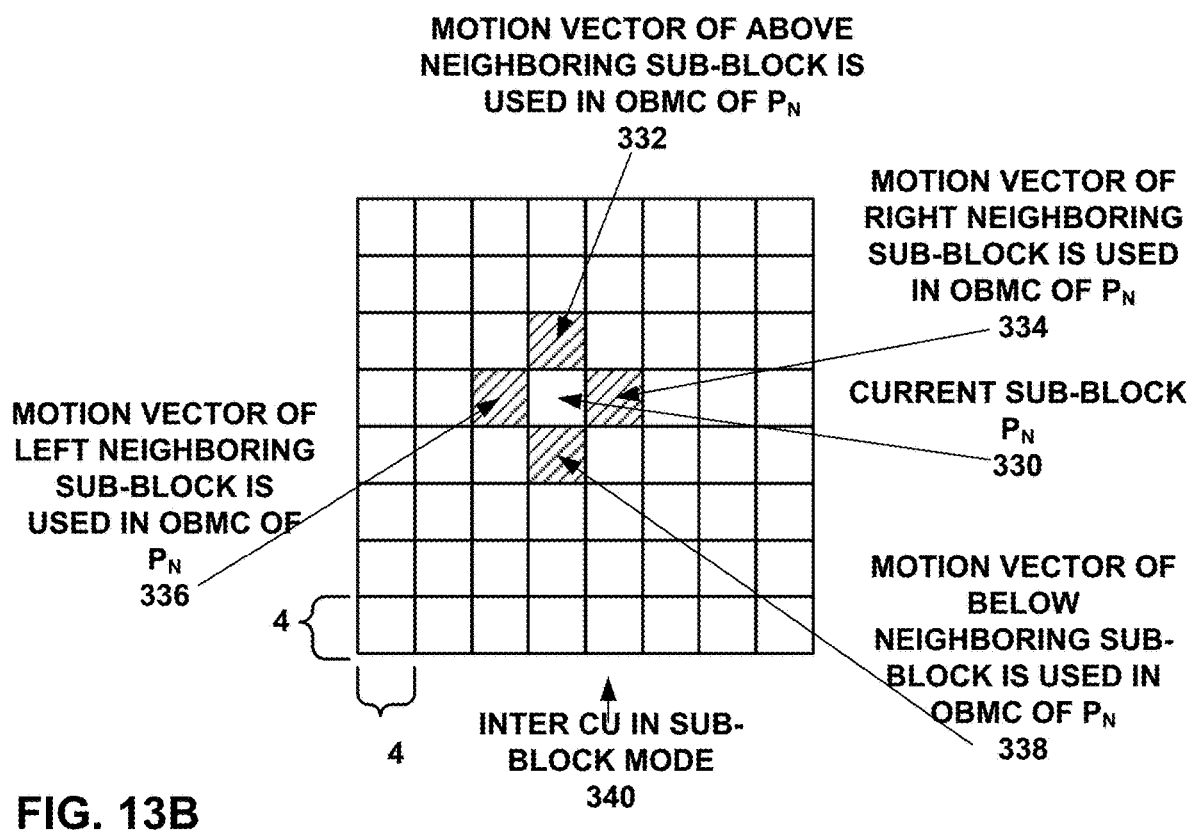

FIGS. 13A and 13B are conceptual diagrams illustrating concepts related to overlapped block motion compensation (OBMC) in JEM. OBMC has been used for early generations of video standards, e.g., as in H.263. In JEM, OBMC is performed for all Motion Compensated (MC) block boundaries except the right and bottom boundaries of a CU. Moreover, it is applied for both luma and chroma components. In JEM, a MC block corresponds to a coding block. When a CU is coded with sub-CU mode (includes sub-CU merge, Affine and FRUC mode, each sub-block of the CU is a MC block. To process CU boundaries in a uniform fashion, OBMC is performed at sub-block level for all MC block boundaries, where sub-block size is set equal to 4×4, as illustrated in FIG. 13. For example, a video coder, such as video encoder 20 or video decoder 30, may perform OBMC on current sub-block 322 of FIG. 3A using motion vectors of above-neighboring sub-block 324 and/or left-neighboring sub-block 326.

When OBMC applies to the current sub-block, besides current motion vectors, motion vectors of four connected neighboring sub-blocks, if available and not identical to the motion vector of the current sub-block, are also used to derive prediction block for the current sub-block. These multiple prediction blocks based on multiple motion vectors are combined to generate the final prediction signal of the current sub-block.

As shown in FIG. 13B, a prediction block based on motion vectors of a neighboring sub-block is denoted as $P_N$, with N indicating an index for the neighboring above sub-block 332, below sub-block 338, left sub-block 336, and right sub-block 334, and a prediction block based on motion vectors of the current sub-block 330 denoted as $P_C$. When $P_N$ is based on the motion information of a neighboring sub-block that contains the same motion information to the current sub-block, the OBMC is not performed from $P_N$. Otherwise, every pixel of PN is added to the same pixel in PC, i.e., four rows/columns of $P_N$ are added to $P_C$. The weighting factors {1/4, 1/8, 1/16, 1/32} are used for $P_N$ and the weighting factors {3/4, 7/8, 15/16, 31/32} are used for $P_C$. The exception is small MC blocks, (i.e., when height or width of the coding block is equal to 4 or a CU is coded with sub-CU mode), for which only two rows/columns of $P_N$ are added to $P_C$. In this case, weighting factors {1/4, 1/8} are used for $P_N$ and weighting factors {3/4, 7/8} are used for $P_C$. For $P_N$, generated based on motion vectors of vertically (horizontally) neighboring sub-block, pixels in the same row (column) of $P_N$ are added to $P_C$ with a same weighting factor. It is noted that BIO is also applied for the derivation of the prediction block $P_N$.

Figure 14A:
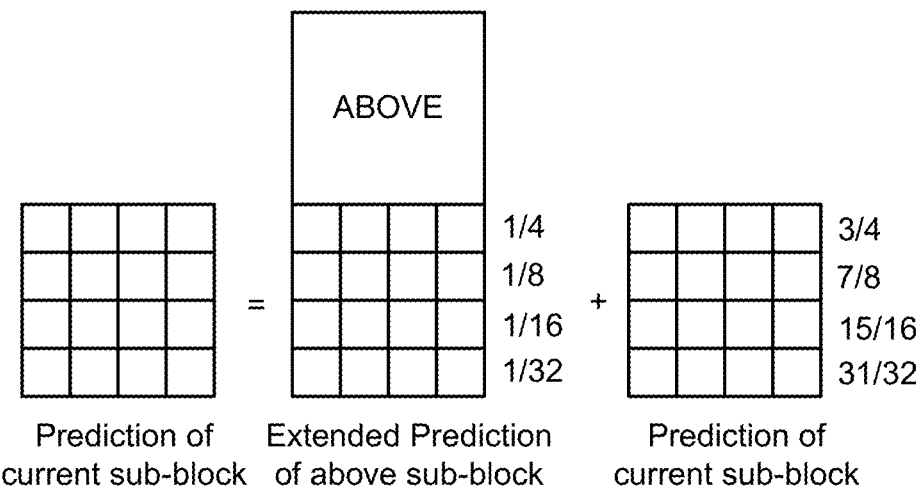
FIGS. 14A-14D are conceptual diagrams illustrating OBMC weightings.
Figure 14B:
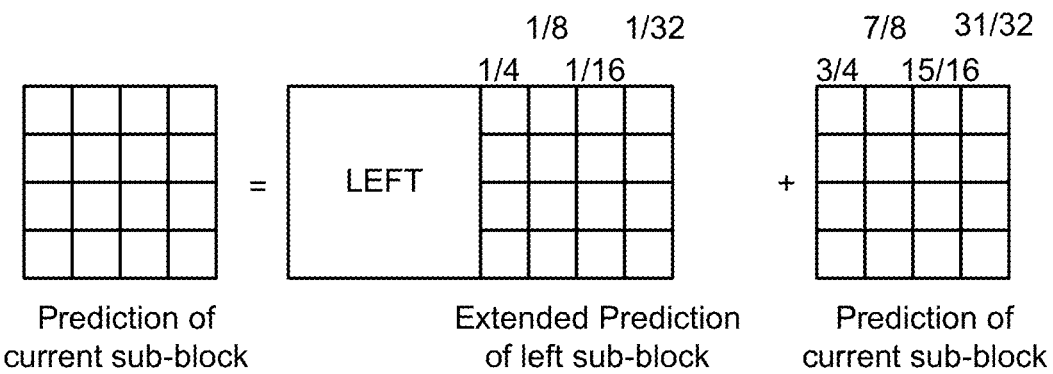
Figure 14C:
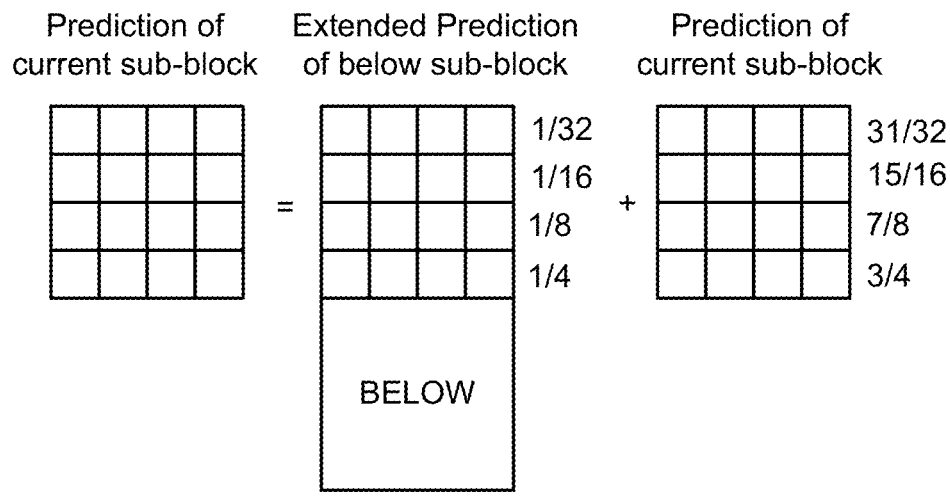
Figure 14D:
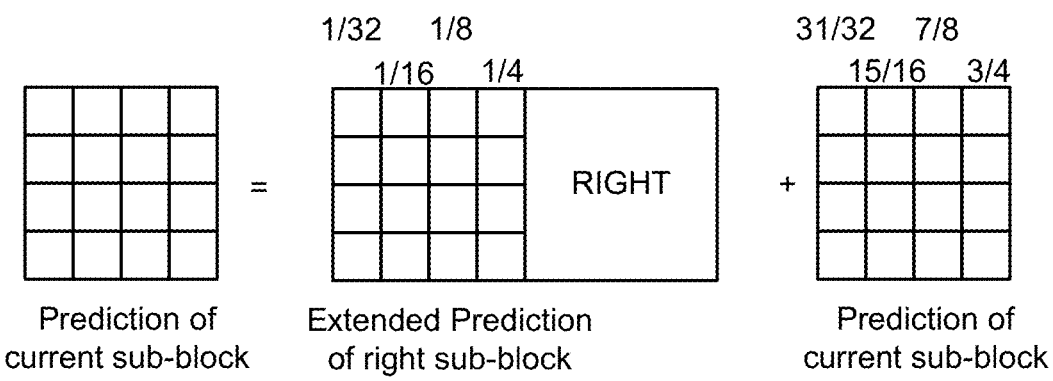

FIGS. 14A-14D are conceptual diagrams illustrating OBMC weightings. In particular, FIG. 14A illustrates an above sub-block for extended prediction, FIG. 14B illustrates a left sub-block for extended prediction, FIG. 14C illustrates a below sub-block for extended prediction, and FIG. 14D illustrates a right sub-block for extended prediction.

In JEM, for a CU with size less than or equal to 256 luma samples, a CU level flag is signalled to indicate whether OBMC is applied or not for the current CU. For the CUs with size larger than 256 luma samples or not coded with AMVP mode, OBMC is applied by default. Video encoder 20 may take account of the impact of OBMC on a CU during the motion estimation stage as discussed above. Video encoder 20 may use the prediction signal by using motion information of the top neighboring block and the left neighboring block to compensate the top and left boundaries of the original signal of the current CU, and then apply the normal motion estimation process.

Conventional DMVD-related methods (BIO, FRUC Bilateral Matching, FRUC Template Matching, Bilateral Template matching and so on) provide significant bit-rate reductions. However, some information may not be utilized in conventional approaches. This disclosure describes several techniques and that may further improve DMVD, which may be performed by video encoder 20 and/or video decoder 30.

Figure 15A:
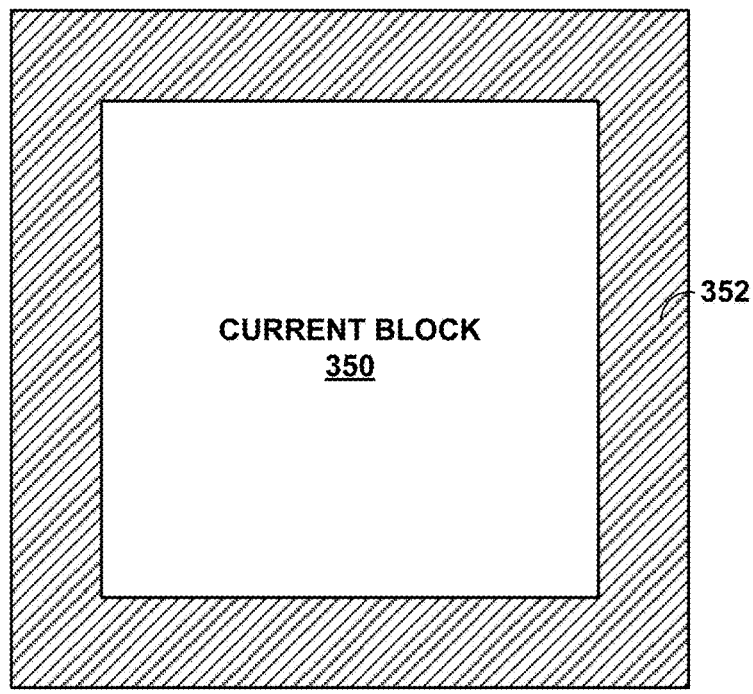
FIGS. 15A and 15B are conceptual diagrams illustrating example extended areas for a pixel clue according to techniques of this disclosure.
Figure 15B:
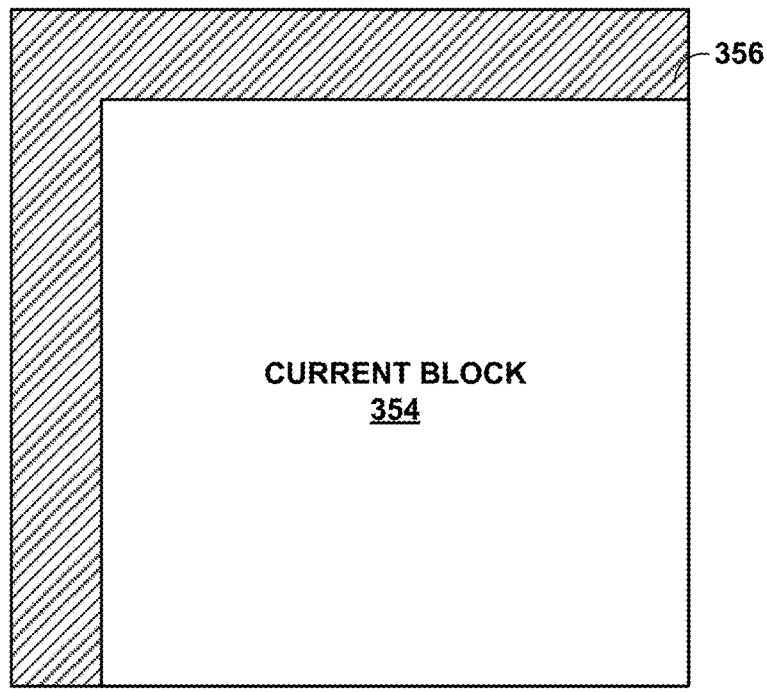

FIGS. 15A and 15B are conceptual diagrams illustrating examples of extended areas 352, 356 for a pixels clue of current blocks 350, 354, respectively. When a video coder (e.g., video encoder 20 or video decoder 30) generates a pixels clue from motion compensated (MC) blocks, the video coder can extend the size of the pixels clue by fetching and deriving more reference pixels. For example, if the size of current block is M×N, the video coder can derive a (M+I)×(N+J) MV blocks as the pixels clue. Moreover, the extended area can be of any shape. For example, as shown in FIG. 15A, extended area 352 is the area surrounding current block 350. As another example, the extended area can be asymmetric. For example, as shown in FIG. 15B, extended area 356 is asymmetric to current block 354.

Figure 16:
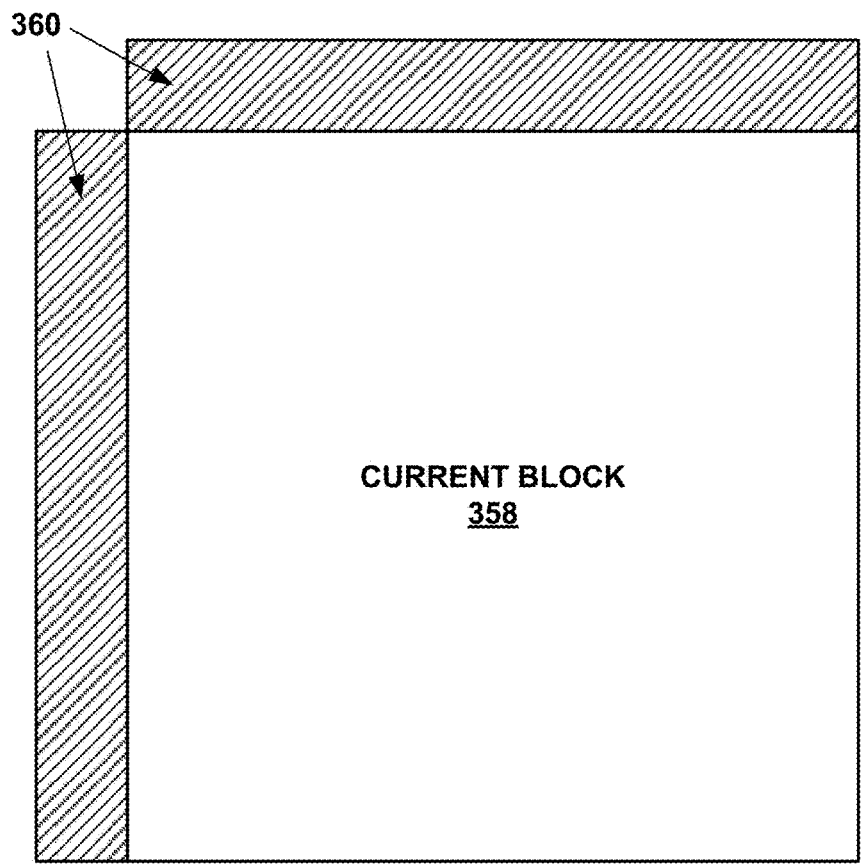
FIG. 16 is a conceptual diagram illustrating another example extended area for a pixel clue where the extended area is irregular according to techniques of this disclosure.

Moreover, the extended area can also be irregular, as shown in FIG. 16. FIG. 16 is a conceptual diagram illustrating another example extended area 360 for current block 358.

The extended areas of FIGS. 15 and 16 may serve the purpose of the templates used by FRUC Template Matching method as discussed above. Note that when the video coder (e.g., video encoder 20 or video decoder 30) derives the pixels clue from the current picture, the pixels within the extended area can be the neighboring reconstructed pixels or the motion compensated prediction pixels.

In another example, the video coder (e.g., video encoder 20 or video decoder 30) can decide whether to include a specific extended area from top/right/bottom/left. If object occlusion occurs at a specific direction, the video coder uses a different QP value from specific neighboring blocks, or when a neighboring block is illumination-compensated without residual, the video coder can detect these events by calculating an SAD (or mean-removed SAD) value with and without the specific template. If the SAD value accumulated by including the specific template exceeds a pre-defined threshold, the video coder can choose not to include the specific template into the pixel clue. Alternatively, the selection of the specific extended area can be signaled from the encoder side to provide a better trade-off between decoder complexity and coding performance.

In another example, due to the nature of flexible shape of the prediction block, when the ratio of width-to-height or the ratio of height-to-width is higher than a pre-defined threshold, the use of template can be restricted to the longer side for more stable prediction. This threshold can also be signaled in the bitstream (e.g., by video encoder 20, and retrieved/decoded by video decoder 30).

Video encoder 20 may derive any additional information that may be useful to video decoder 30 to improve the MV derivation using the pixels clue. For example, video encoder 20 can signal the residual or pixel offsets to video decoder 30, and the pixels clue can be improved by the signaled residual or pixel offsets to perform better MV derivation.

In existing DMVD approaches, motion vectors and prediction directions (L0, L1 or Bi-predictions) for a block or sub-block are derived at both encoder and decoder side with the same methods, so that the information does not need to be signalled in the bitstream. The techniques of this disclosure may further improve these derivation approaches, and extend the scope of the existing DMVD approach to determine more prediction information at the decoder side (e.g., at video decoder 30, and/or during a decoding process performed by video encoder 20).

In certain DMVD approaches, video encoder 20 and video decoder 30 may determine the inter prediction directions (L0, L1 or Bi-prediction) according to the matching costs between different prediction directions. For example, assuming the matching costs for L0, L1 and Bi-prediction are CostL0, CostL1 and CostBi, respectively, the prediction directions can be determined by choosing the prediction direction with minimum cost (based on an assumption that smaller cost means better matching result). As mentioned below, the matching cost can be sum of absolute difference (SAD), sum of squared difference (SSD) sum of absolute transform difference (SATD), or any other cost measure methods.

Based on observations during development of the techniques of this disclosure, it was found that bi-prediction usually provides more stable prediction results. Therefore, in accordance with the techniques of this disclosure, the video coder (e.g., video encoder 20 or video decoder 30) may add a bias value to the matching costs so that bi-prediction is preferably selected. In one example, the costs for list 0 (L0) and list 1 (L1) uni-prediction is scaled up by a scaling value (for example, equal to 1.25) and the scaled L0 and L1 costs are then compared to the bi-prediction costs to select the best prediction direction. In another example, the costs for bi-prediction is scaled down by a scaling value (for example, equal to 0.75) and the scaled bi-prediction cost is then compared to the L0 and L1 costs to select the best prediction direction. The scaling value can be pre-defined at both video encoder 20 and video decoder 30 (e.g., as configuration information), or alternatively, video encoder 20 may signal the scaling value in the bitstream (and video decoder 30 may decode the scaling value).

The video coder (e.g., video encoder 20 or video decoder 30) may use the pixels clue to determine motion partitions (e.g., 2N×2N, 2N×N, N×2N, N×N and so on) for a block. A current block is divided into sub-blocks according to different motion partitions and the cost of each sub-block is calculated using its associated pixels clue. And then all the costs between different motion partitions are compared to each other to determine the best motion partition for the current block. Different cost offsets can be added to different motion partitions to adjust the precision of the motion partition determination.

Figure 17A:
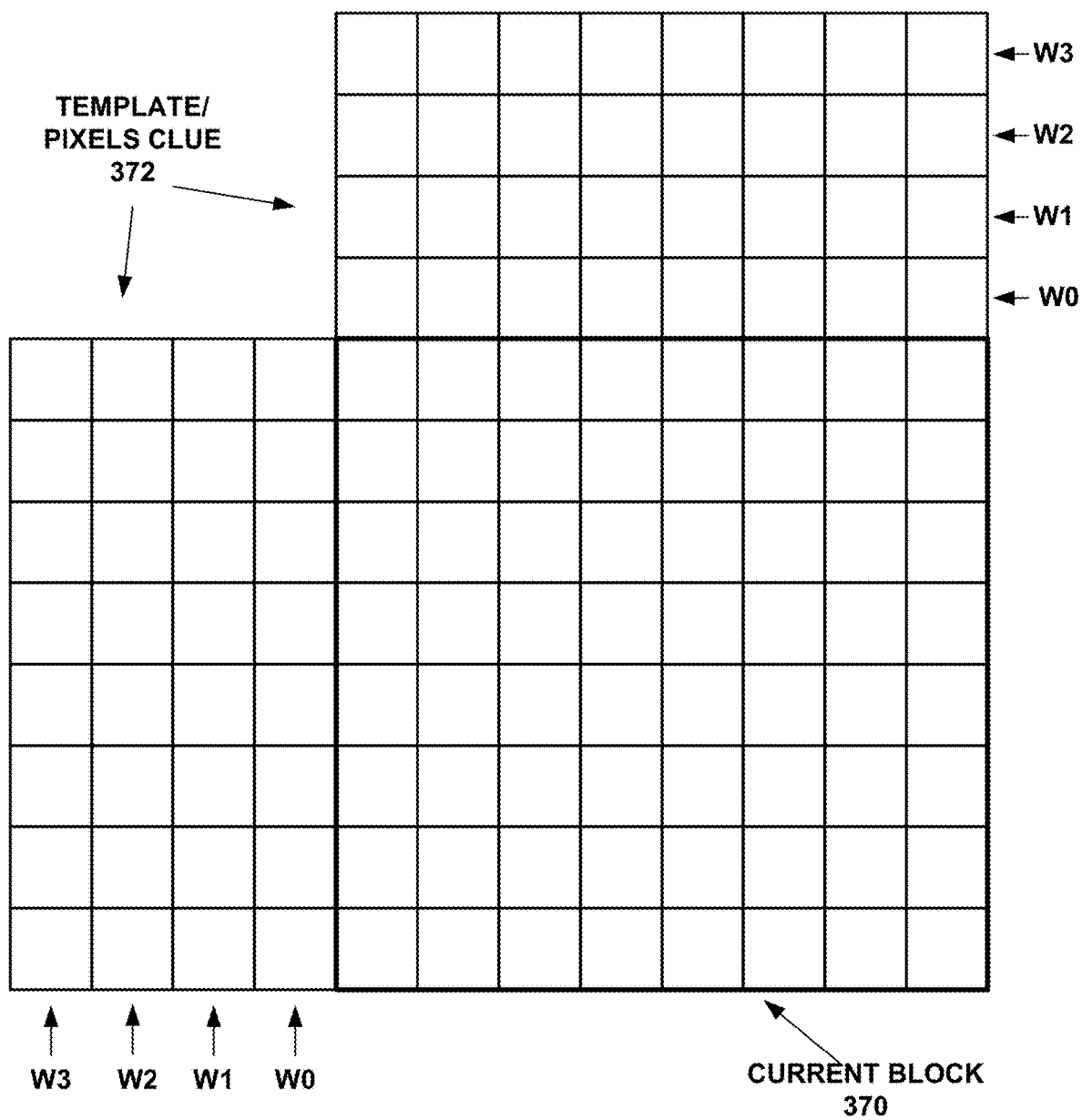
FIGS. 17A-17C are conceptual diagrams illustrating example weightings assigned to various pixels according to techniques of this disclosure.
Figure 17B:
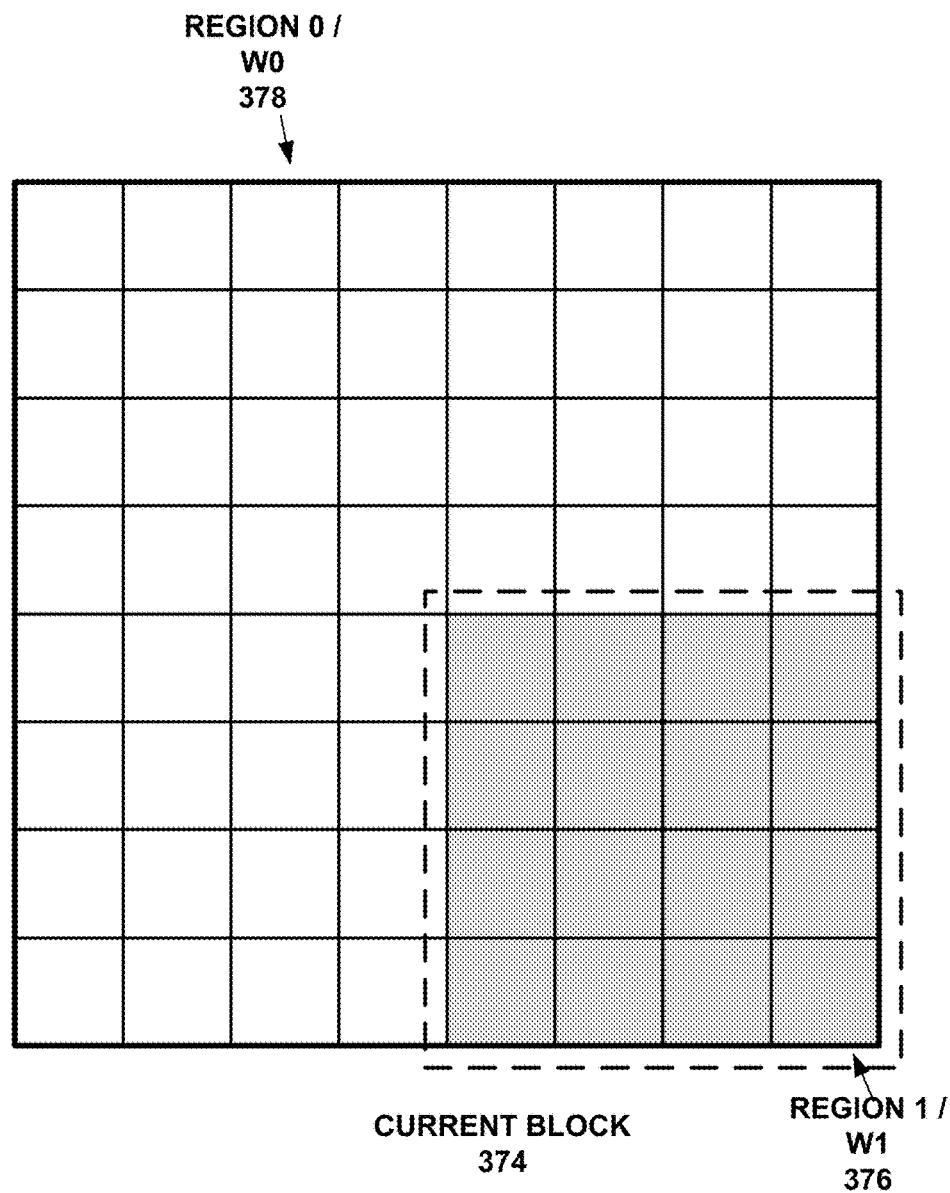
Figure 17C:
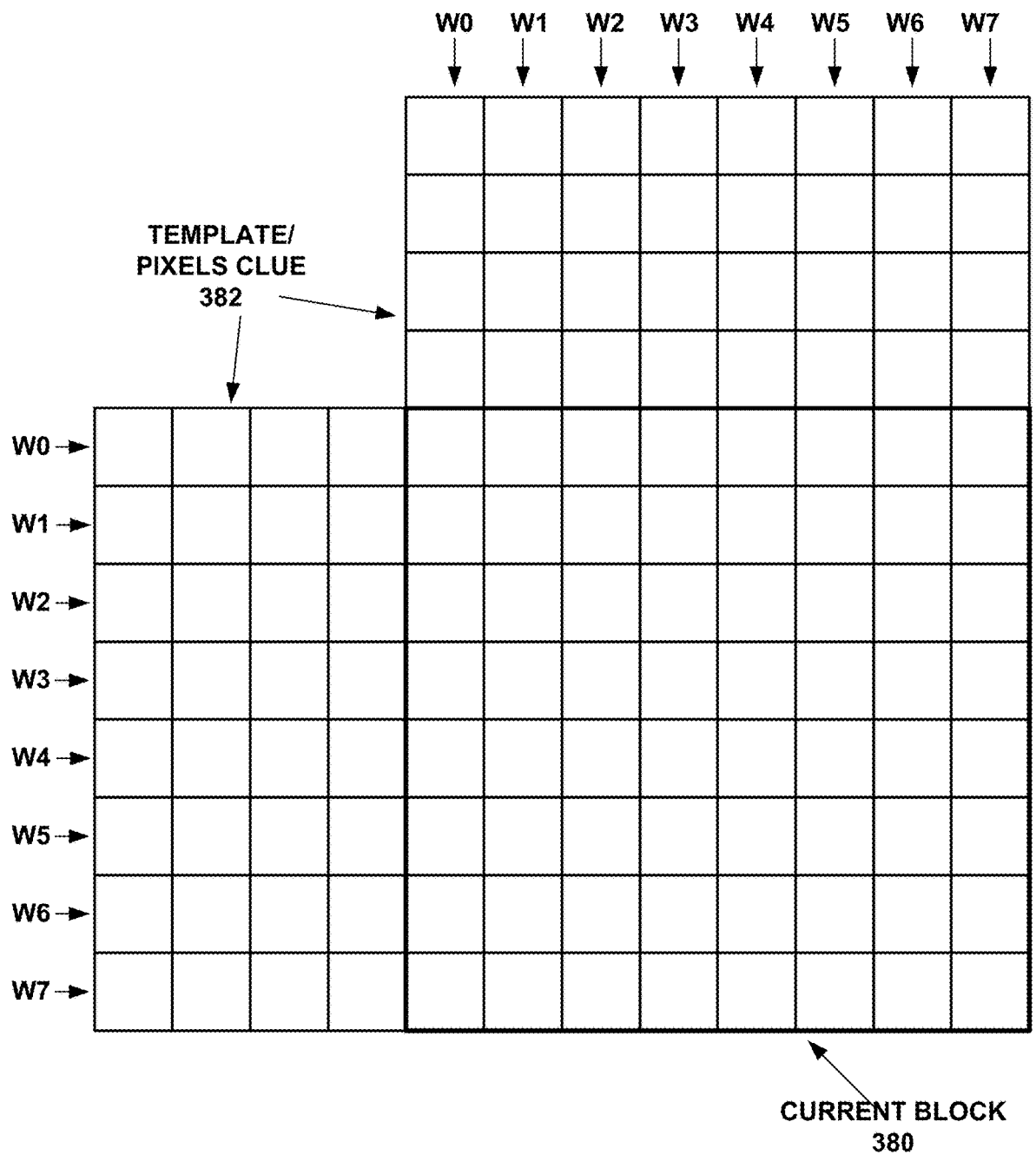

FIGS. 17A-17C are conceptual diagrams illustrating example weightings given to various pixels according to techniques of this disclosure. When calculating the matching costs, sum of absolute difference (SAD), sum of squared difference (SSD) sum of absolute transform difference (SATD), mean absolute difference (MAD), mean squared difference (MSD), or any other cost measure methods can be used. According to the techniques of this disclosure, the video coder may apply weightings to the cost calculation for different pixels. Examples are shown in FIGS. 17A-17C. In FIG. 17A, different weightings are given to different rows and columns of template 372 used for current block 370 in FRUC Template Matching. In FIG. 17B, the bottom-right portion 376 of current block 374 and the remaining portion 378 of current block 374 can use different weightings (W1 and W0, respectively). Note that the weighting patterns are not restricted to these two examples of FIGS. 17A and 17B.

Moreover, the weightings can be adaptive according to the coded information such as block size and coded modes. In one example, the weighted SAD as shown in FIG. 17A is applied to the FRUC Template Matching. For blocks with both width and height equal or larger than 32, the weighting factors w0=½, w1=¼, w2=⅛ and w3=⅛ are used. For the other blocks, the weighting factors w0=1, w1=½, w2=¼ and w3=⅛ are used.

Furthermore, the weightings can be adaptive according to the reconstructed pixel in the template. Depending on the variance of the pixel value or edge structure in the template, weightings could be designed and applied.

In another example, the weighting SAD (or weighted SAD) as shown in FIG. 17B is applied to the FRUC Bilateral Matching or Bilateral Template Matching with the w0=1 and w2=2.

When a video coder, such as video encoder 20 or video decoder 30, performs decoder-side motion vector derivation (DMVD) on more than one MV candidates, the video coder may selectively apply DMVD to partial sets of MV candidates according to coded information, such as motion information, pixel information, block size, and so on. In one example, when one MV candidate is similar or identical to the previously derived MV candidates, the video coder disables the Bilateral Template Matching for this MV candidate (or removes this MV candidate from the MV candidates list). More specifically, in some examples, when the MV difference between one MV candidate and any of the previously derived MV candidates is smaller than a pre-defined threshold (e.g. 1 pixel), the video coder disables Bilateral Template Matching for this MV candidate (or removes this MV candidate from the MV candidates list). Note that the video coder may perform the MV difference examination on both X and Y components of both L0 and L1 MVs.

In another example, when the MV difference between one MV candidate and any of the previously derived MV candidates is smaller than a pre-defined threshold, the video coder may disable Bilateral Template Matching for this MV candidate (or may remove this MV candidate from the MV candidates list). The thresholds for the MV difference can be different for different block size. For example, for blocks which are smaller than 64 pixel samples, the threshold may be set to ¼ pixel; for blocks that are smaller than 256 pixel samples and larger or equal to 64 pixel samples, the threshold may be set to ½ pixel; for the blocks of other sizes, the threshold may be set to 1 pixel. Note that the video coder may perform the MV difference examination on both X and Y components of both L0 and L1 MVs.

In some examples, when a video coder, such as video encoder 20 or video decoder 30, calculates the matching costs, the video coder may calculate, for example, any or all of: sum of absolute difference (SAD), sum of squared difference (SSD) sum of absolute transform difference (SATD), mean removal SAD, mean removal SSD, or any other cost measure method. In accordance with the techniques of this disclosure, the video coder may apply weightings to the cost calculation for different pixels. In this manner, the video coder may be configured with associated weight for each pixel in the Pixels Clue to calculate the weighted cost (the cost can be absolute difference, squared difference, absolute transform difference, mean removal absolute difference or mean removal square difference, for example). The video coder then uses the sum of all the weighted cost of the pixels within the Pixels Clue to determine the motion information, such as motion vectors, reference pictures, and so on. There are various ways to determine the weights as illustrated below. The video coder may apply any or all of the following example techniques, alone or in any combination:

1. The video coder may determine associated weights according to the distance between the pixels and any specific point (e.g., centroid or corner points) of a current block of video data. In one example, the video coder assigns relatively lower weights to pixels that have higher distances from the specified point, or vice versa. The video coder may classify pixels into groups and assign specific points for each group. Thus, the video coder may determine associated weights for the pixels in each group according to the distance between the pixels in the group and the group's specific point of current block.
2. The video coder may determine associated weights according to the distance between the pixels and any specific point (e.g., centroid or corner points) of the pixels clue, such as the template used in FRUC Template Matching. In one example, the video coder assigns higher distances higher weights, or vice versa. In some examples, the video coder may classify the pixels into groups and assign specific points for each group. Thus, the video coder may determine associated weights for the pixels in each group according to the distance between the pixels in the group and the group's specific point of the pixels clue.
3. The video coder may use line-based weights, as shown in FIGS. 17A and 17C, for simplification. FIG. 17C depicts current block 380 and pixels clue 382. The video coder may be configured with weights (W0-W3 in FIG. 17A; W0-W7 in FIG. 17C) for each vertical or horizontal line. For further simplicity, the video coder may be configured with the same weight for several neighboring lines. The size of current block may be defined as M×N, where M and N are integer values that may be, but are not necessarily, equal (in the example of FIG. 17C, the current block is 8×8). In one example, every (M/O) line shares the same weight along the horizontal side, and every (N/O) line shares the same weight along the vertical side. In this example, M, N, and O are any positive integer number. In one example, if O=4, as in the example of FIG. 17C, W0 and W1 are the same; W2 and W3 are the same; W4 and W5 are the same; and W6 and W7 are the same. Note that multiple line-based weights can be applied together. For example, the video coder may determine the associated weight for each pixel by applying both the line-based weights as shown in FIGS. 17A and 17C.
4. For line-based weights, the weights of neighboring lines may be in monotonically increasing or decreasing order. For example, the weights may be constrained as W0<=W1<=W2<=W3<=W4<=W5<=W6<=W7 or w0>=W1>=W2>=W3>=W4>=W5>=W6>=W7, for the example of FIG. 17B.

5. To achieve further simplifications, region-based weights may be used, as shown in FIG. 17B. The video coder may divide the pixels in a pixels clue for current block 374 into several regions. The video coder may be configured with an associated weight for each region. In the example of FIG. 17C, a first region 378 (region 0) is assigned a first weight (W0), where the first region includes the white pixels, while a second region 376 (region 1) is assigned a second weight (W1), where the second region includes the grey shaded pixels and outlined with a dashed line.

6. The weightings can be adaptive depending on the coding information such as block size, block modes and reconstructed pixels. For example, blocks of different size may have different weights sets. Thus, the video coder may determine the weightings adaptively based on any or all of these factors for a current block and/or reference blocks used in DMVD.

Figure 18:
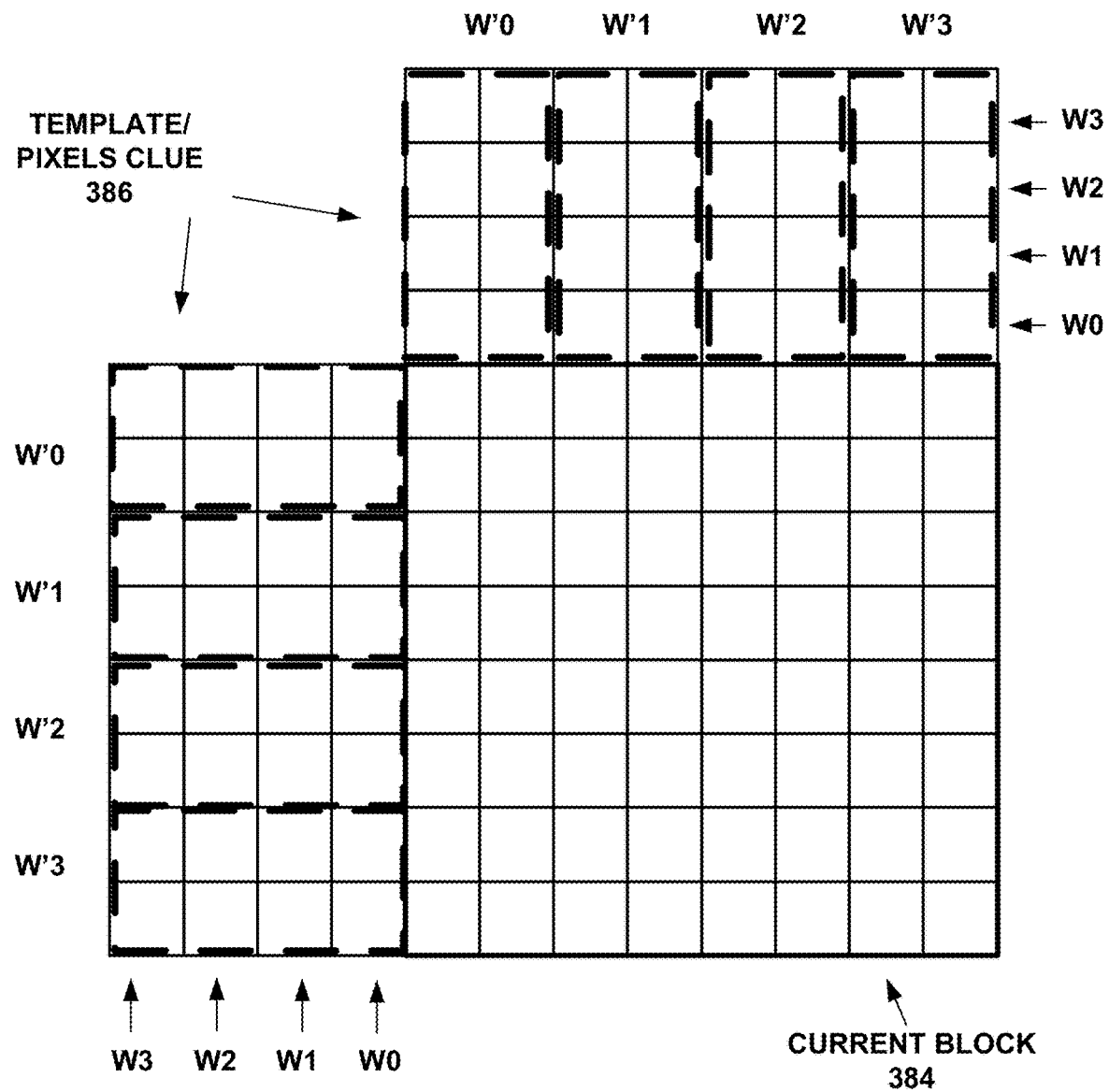
FIG. 18 is a conceptual diagram illustrating another example of weight values assigned to various pixels according to techniques of this disclosure.

FIG. 18 is a conceptual diagram illustrating another example of weight values applied to pixels clue 386 for current block 384. A specific example using a combination of some of the above techniques is as follows. Current block 384 is an M×N block in this example. In this example, horizontal line-based weights and vertical line-based weights are both used. Moreover, every (M/4) vertical line shares the same weight along the horizontal side, and every (N/4) lines share the same weight along the vertical side, in this example. As shown in FIG. 18, for the blocks with both width and height equal or larger than 8, the weighting factors w0=1, w1=1, w2=½ and w3=¼ are used, while w'0=1, w'1=½, w'2=½ and w'3=0. For the other blocks, the weighting factors w0=1, w1=½, w2=¼ and w3=0 are used, while w'0=1, w'1=1, w'2=1 and w'3=1.

Figure 19A:
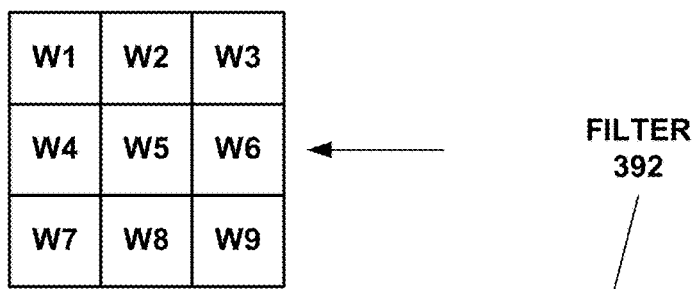
FIGS. 19A and 19B are conceptual diagrams illustrating an example filter applied to pixels according to techniques of this disclosure.
Figure 19B:
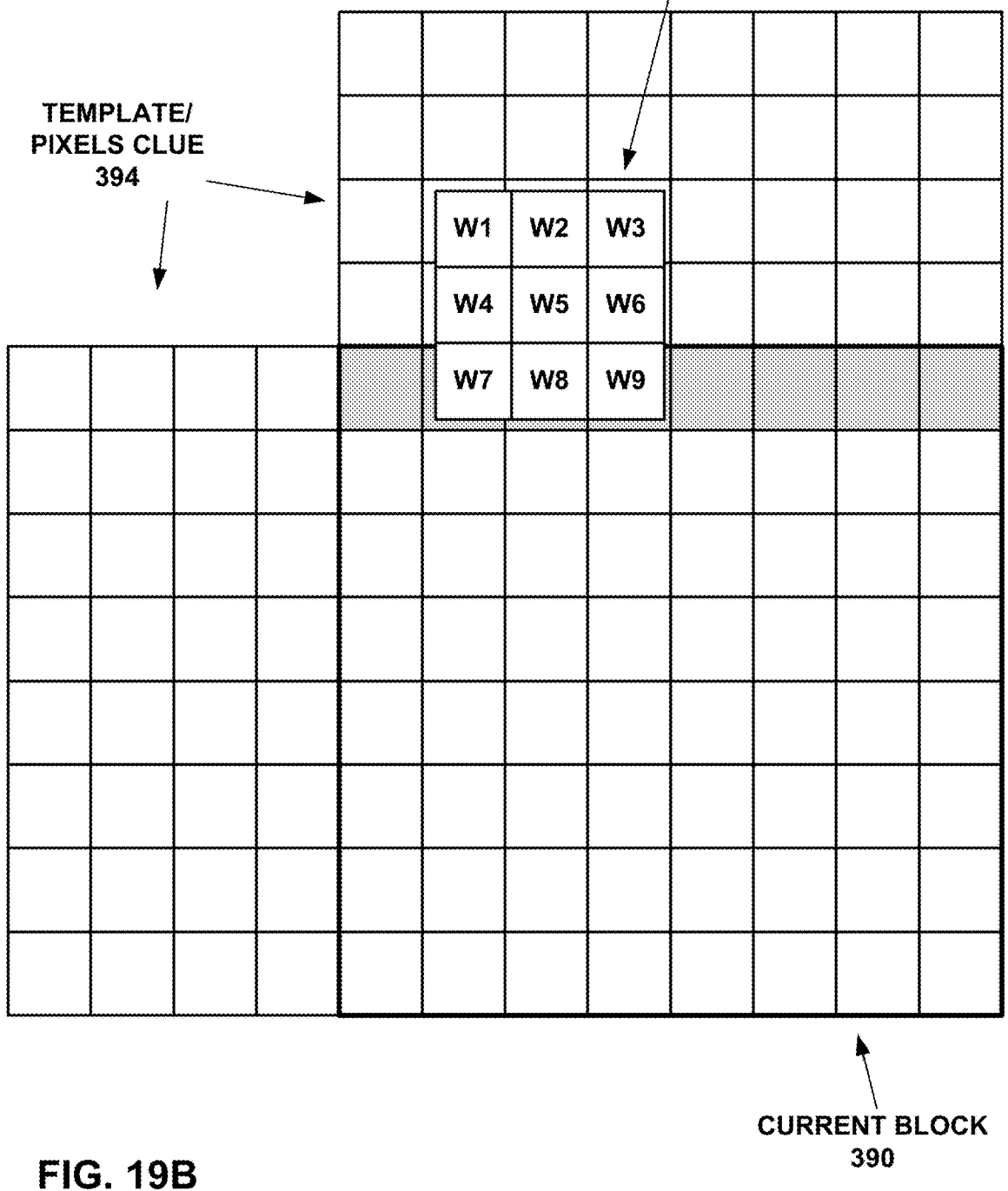

The video coder (e.g., video encoder 20 or video decoder 30) may perform a filtering process (e.g., low pass filter) to pixels clue 386 and/or a prediction for pixels clue 386, to improve the stability of derivation. FIGS. 19A and 19B are conceptual diagrams illustrating an example of a filter for such a filtering process. FIG. 19A illustrates an example of a 3-by-3 filter 392. Before applying filter 392, video coder (e.g., video encoder 20 or video decoder 30) may pad pixels values outside pixels clue 394, as shown in FIG. 19B. That is, in the example of FIG. 19B, the video coder may determine padding values for the pixels of current block 390 shaded in grey (which are outside pixels clue 394), for purposes of applying the filter to filter values of the pixels clue. As shown in FIG. 19B, filter 392 is applied to values of pixels clue 394 and the padding values outside pixels clue 394 to filter values of pixels clue 394. The video coder may combine the filter with the weighted cost. The weights may be in monotonically increasing or decreasing order. For example, the weights may be constrained as W1<=W2<=W3, W4<=W5<=W6, W7<=W8<=W9, W1<=W4<=W7, W2<=W5<=W8, W3<=W6<=W9, W1>=W2>=W3, W4>=W5>=W6, W7>=W8>=W9, W1>=W4>=W7, W2>=W5>=W8, or W3>=W6>=W9.

Figure 20:
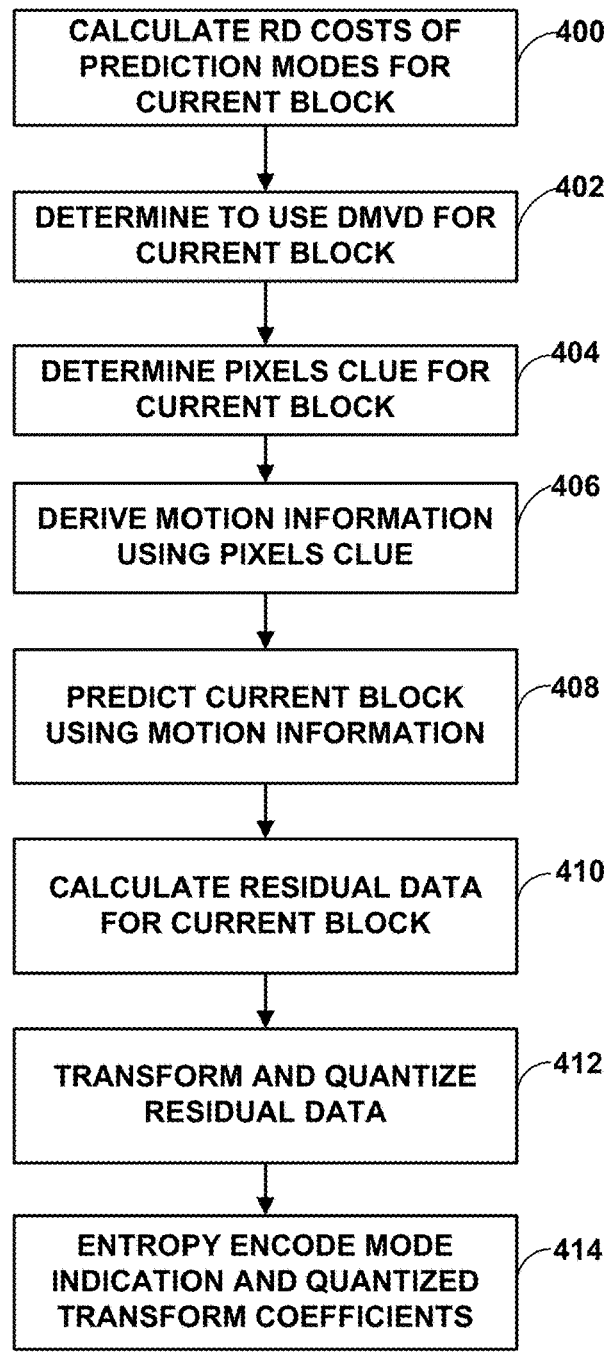
FIG. 20 is a flowchart illustrating an example method for encoding video data according to the techniques of this disclosure.

FIG. 20 is a flowchart illustrating an example method for encoding video data according to the techniques of this disclosure. Video encoder 20 is described as performing the techniques of FIG. 20, for purposes of example, although it should be understood that in other examples, other video encoding devices may perform this or a similar method.

In this method, it is assumed that video encoder 20 has previously encoded one or more pictures, and has received a current block of a current picture to be encoded. The current picture may be a P-picture, a B-picture, or other picture for which inter-prediction is enabled. Mode select unit 40 of video encoder 20 may calculate rate-distortion (RD) costs of performing various prediction modes for the current block (400). Mode select unit 40 may then determine that decoder-side motion vector derivation (DMVD) yields the best RD cost among the modes tested, and therefore, determine to use DMVD for the current block (402). In this manner, video encoder 20 may determine that motion information of the current block of video data is to be derived using DMVD.

Mode select unit 40 may then signal to motion compensation unit 44 that DMVD is to be used to predict the current block. In response, motion compensation unit 44 may determine a pixels clue for the current block (404). For example, motion compensation unit 44 may determine the pixels clue using one of template matching, bilateral matching, bilateral template matching, FRUC template matching, or the like, as discussed above. In some examples, motion compensation unit 44 may generate the pixels clue using multiple hypothesis predictions from multiple motion compensated blocks. For example, motion compensation unit 44 may calculate a weighted average of the multiple motion compensated blocks, apply overlapped block motion compensation (OBMC) to the pixels clue, and/or add offsets to motion vectors for the current block and derive the multiple motion compensated blocks from the offset motion vectors. The motion vectors for the current block may be, e.g., MV candidates determined according to merge and/or AMVP modes (e.g., from neighboring blocks that are predicted using inter-prediction). In this manner, video encoder 20 may determine a pixels clue for the current block, the pixels clue comprising pixel data obtained from one or more groups of previously decoded pixels.

Motion compensation unit 44 may ultimate derive motion information using the pixels clue (406). In general, the motion information may include one or more motion vectors that refer to one or more reference blocks corresponding to the pixels clue. In some examples, motion compensation unit 44 may determine an inter-prediction direction (e.g., prediction from list 0, list 1, or bi-prediction) for the derived motion information according to matching costs between different prediction directions. For example, motion compensation unit 44 may select an inter-prediction direction having a lowest tested matching cost. In some examples, as discussed above, motion compensation unit 44 may weight the resulting matching costs such that the matching costs are biased in favor of bi-prediction, e.g., by using a weight that reduces the matching cost of bi-prediction and/or by using weights that increase the matching cost of uni-prediction. Additionally or alternatively, motion compensation unit 44 may calculate matching costs between two or more reference blocks using two or more different cost measurement processes, and then refine the derived motion information based on an aggregate matching cost calculated from the matching costs calculated using the various cost measurement processes. In this manner, video encoder 20 may derive the motion information for the current block according to DMVD from the pixels clue.

Ultimately, motion compensation unit 44 may predict the current block using the derived motion information (408), to form a prediction block for the current block. Motion compensation unit 44 may pass this prediction block to summer 50, which subtracts the prediction block from the original, uncoded version of the current block (on a pixel-by-pixel basis), to calculate a residual block including residual data for the current block (410). Transform processing unit 52 may then transform the residual block to a transform domain (e.g., a frequency domain), forming transform coefficients, and quantization unit 54 may quantize the transform coefficients, to transform and quantize the residual data (412). Ultimately, entropy encoding unit 56 may entropy encode data representative of the prediction mode (e.g., a FRUC flag and a matching mode flag), as well as the quantized transform coefficients (414).

It should be understood that although described as part of a video encoding process, video encoder 20 also performs a decoding process. That is, after transforming and quantizing the residual data, inverse quantization unit 58 inverse quantizes the quantized transform coefficients to reproduce the transform coefficients. Then, inverse transform unit 60 inverse transforms the transform coefficients, to reproduce the residual block. Summer 62 then combines the residual block with the prediction block, forming a decoded block that can be stored in a decoded picture buffer of reference picture memory 64. Accordingly, the process performed by video encoder 20 may be said to include decoding of video data. Likewise, in this manner, video encoder 20 may decode the current block using the motion information derived according to DMVD.

In this manner, the method of FIG. 20 represents an example of a method of decoding video data, the method including determining that motion information of a current block of video data is to be derived using decoder-side motion vector derivation (DMVD), determining a pixels clue for the current block, the pixels clue comprising pixel data obtained from one or more groups of previously decoded pixels, deriving the motion information for the current block according to DMVD from the pixels clue, and decoding the current block using the motion information.

Figure 21:
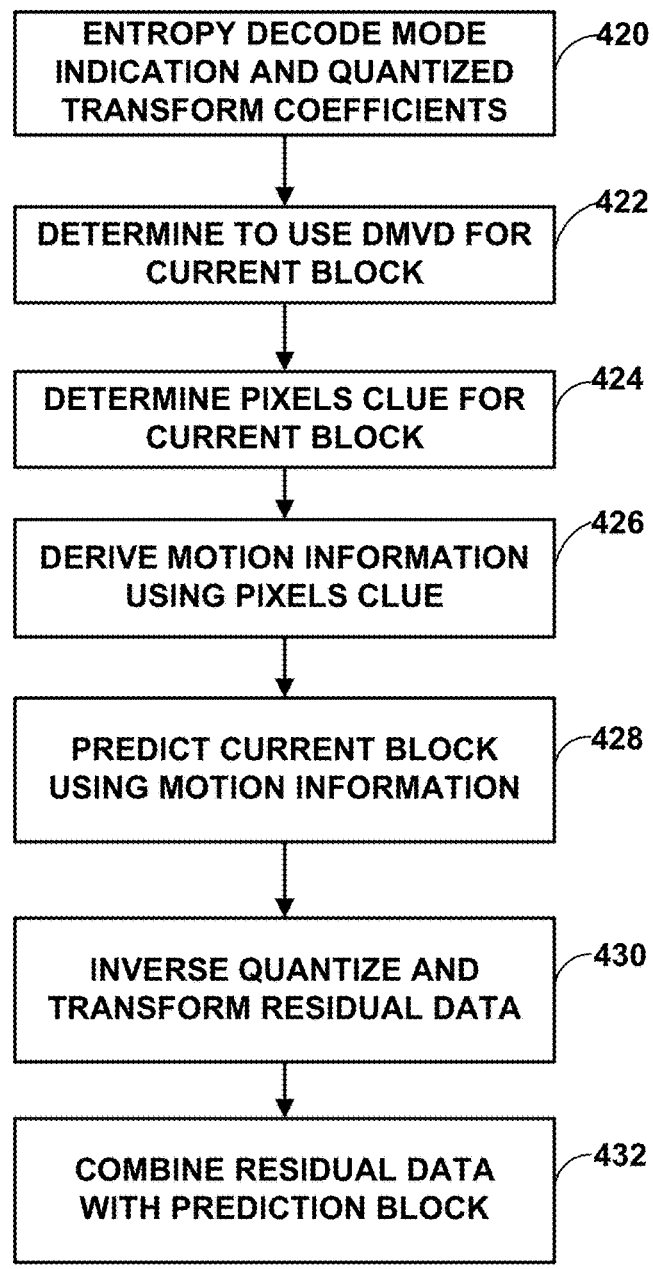
FIG. 21 is a flowchart illustrating an example method for decoding video data according to the techniques of this disclosure.

FIG. 21 is a flowchart illustrating an example method for decoding video data according to the techniques of this disclosure. Video decoder 30 is described as performing the techniques of FIG. 21, for purposes of example, although it should be understood that in other examples, other video encoding devices may perform this or a similar method.

In this method, it is assumed that video decoder 30 has previously decoded one or more pictures, and has received a current block of a current picture to be decoded. The current picture may be a P-picture, a B-picture, or other picture for which inter-prediction is enabled. Entropy decoding unit 70 may entropy decode a prediction mode indication for the current block, as well as quantized transform coefficients for the current block (420). Entropy decoding unit 70 may pass the prediction mode indication to motion compensation unit 72 and the quantized transform coefficients to inverse quantization unit 76. Motion compensation unit 72 may then determine that decoder-side motion vector derivation (DMVD) is to be used for the current block from the prediction mode indication (422). In this manner, video decoder 30 may determine that motion information of the current block of video data is to be derived using DMVD.

Motion compensation unit 72 may then determine a pixels clue for the current block (424). For example, motion compensation unit 72 may determine the pixels clue using one of template matching, bilateral matching, bilateral template matching, FRUC template matching, or the like, as discussed above. In some examples, motion compensation unit 72 may generate the pixels clue using multiple hypothesis predictions from multiple motion compensated blocks. For example, motion compensation unit 72 may calculate a weighted average of the multiple motion compensated blocks, apply overlapped block motion compensation (OBMC) to the pixels clue, and/or add offsets to motion vectors for the current block and derive the multiple motion compensated blocks from the offset motion vectors. The motion vectors for the current block may be, e.g., MV candidates determined according to merge and/or AMVP modes (e.g., from neighboring blocks that are predicted using inter-prediction). In this manner, video decoder 30 may determine a pixels clue for the current block, the pixels clue comprising pixel data obtained from one or more groups of previously decoded pixels.

Motion compensation unit 72 may ultimate derive motion information using the pixels clue (426). In general, the motion information may include one or more motion vectors that refer to one or more reference blocks corresponding to the pixels clue. In some examples, motion compensation unit 72 may determine an inter-prediction direction (e.g., prediction from list 0, list 1, or bi-prediction) for the derived motion information according to matching costs between different prediction directions. For example, motion compensation unit 72 may select an inter-prediction direction having a lowest tested matching cost. In some examples, as discussed above, motion compensation unit 72 may weight the resulting matching costs such that the matching costs are biased in favor of bi-prediction, e.g., by using a weight that reduces the matching cost of bi-prediction and/or by using weights that increase the matching cost of uni-prediction. Additionally or alternatively, motion compensation unit 72 may calculate matching costs between two or more reference blocks using two or more different cost measurement processes, and then refine the derived motion information based on an aggregate matching cost calculated from the matching costs calculated using the various cost measurement processes. In this manner, video decoder 30 may derive the motion information for the current block according to DMVD from the pixels clue.

Ultimately, motion compensation unit 72 may predict the current block using the derived motion information (428), to form a prediction block for the current block. Motion compensation unit 72 may pass this prediction block to summer 80. Meanwhile, inverse quantization unit 76 inverse quantizes the quantized transform coefficients to reproduce transform coefficients for the current block, and inverse transform unit 78 inverse transforms the transform coefficients to reproduce a residual block for the current block (430). Inverse transform unit 78 passes the residual block to summer 80, which adds the prediction block to the residual block (on a pixel-by-pixel basis) (432), to decode the current block.

In this manner, the method of FIG. 21 represents an example of a method of decoding video data, the method including determining that motion information of a current block of video data is to be derived using decoder-side motion vector derivation (DMVD), determining a pixels clue for the current block, the pixels clue comprising pixel data obtained from one or more groups of previously decoded pixels, deriving the motion information for the current block according to DMVD from the pixels clue, and decoding the current block using the motion information.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, processing circuitry (including fixed function circuitry and/or programmable processing circuitry), application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    determining that motion information of a current block of video data is to be derived using decoder-side motion vector derivation (DMVD);
    determining a pixels clue for the current block, the pixels clue comprising pixel data obtained from one or more groups of previously decoded pixels;
    determining an inter-prediction direction for the motion information according to matching costs between different prediction directions, wherein determining the inter-prediction direction comprises scaling weighting costs associated with uni-prediction up by a scaling factor;
    deriving the motion information for the current block according to DMVD from the pixels clue, wherein deriving the motion information comprises deriving the motion information according to DMVD such that the motion information has the determined inter-prediction direction; and
    decoding the current block using the motion information.

2. The method of claim 1, wherein determining the pixels clue comprises generating the pixels clue using multiple hypothesis predictions from multiple motion compensated blocks.

3. The method of claim 2, wherein generating the pixels clue comprises calculating a weighted average of the multiple motion compensated blocks.

4. The method of claim 2, wherein generating the pixels clue comprises applying overlapped block motion compensation to generate the pixels clue.

5. The method of claim 2, further comprising:
    adding offsets to motion vectors of the current block; and
    deriving the multiple motion compensated blocks from the offset motion vectors.

6. The method of claim 1, wherein determining the inter-prediction direction comprises selecting the inter-prediction direction having the smallest matching cost.

7. The method of claim 1, wherein determining the inter-prediction direction comprises selecting one of prediction from list0, prediction from list1, or bi-prediction.

8. The method of claim 1, wherein the scaling value comprises 1.25.

9. The method of claim 1, wherein biasing determining the inter-prediction direction comprises scaling a weighting cost associated with bi-prediction down by a scaling value.

10. The method of claim 9, wherein the scaling value comprises 0.75.

11. The method of claim 1, wherein the pixels clue comprises pixel data obtained from a first block of a first reference picture and a second block of a second reference picture, wherein the first reference picture is different than the second reference picture, and wherein deriving the motion information comprises:
    calculating a matching cost between the first block and the second block, wherein calculating the matching costs comprises:
        applying a first weight to a first cost measurement for a first set of corresponding pixels of the first block and the second block; and applying a second weight, different from the first weight, to a second cost measurement for a second set of corresponding pixels of the first block and the second block; and refining the motion information based on the matching cost.

12. The method of claim 11, further comprising:
determining the first weight based on a distance between the first set of corresponding pixels and a first specific point of the current block; and
determining the second weight based on a distance between the second set of corresponding pixels and a second specific point of the current block.

13. The method of claim 12, wherein the specific point comprises one of a centroid of the current block or a corner of the current block.

14. The method of claim 11, further comprising:
determining the first weight based on a distance between the first set of corresponding pixels and a first specific point of the pixels clue; and
determining the second weight based on a distance between the second set of corresponding pixels and a second specific point of the pixels clue.

15. The method of claim 14, wherein the specific point comprises one of a centroid of the current block or a corner of the current block.

16. The method of claim 11, further comprising:
determining the first weight based on at least one of a first row that includes the first set of corresponding pixels or a first column that includes the first set of corresponding pixels; and
determining the second weight based on at least one of a second row that includes the second set of corresponding pixels or a second column that includes the second set of corresponding pixels.

17. The method of claim 11, further comprising:
determining the first weight based on a first region that includes the first set of corresponding pixels; and
determining the second weight based on a second region that includes the second set of corresponding pixels.

18. The method of claim 1, wherein deriving the motion information comprises selectively applying DMVD to a partial set of motion vector candidates in a motion vector candidate list for the current block, the method further comprising determining that a motion vector of the motion information derived using DMVD differs from at least one motion vector candidate in the motion vector candidate list for the current block by a threshold prior to decoding the current block using the motion information.

19. The method of claim 1, further comprising iteratively refining the pixels clue using refined motion vectors, wherein iteratively refining comprises:
after deriving a refined motion vector, regenerating a bilateral template using the refined motion vector; and
performing a further motion vector refinement using the regenerated bilateral template.

20. The method of claim 1, further comprising applying one or more filters to the pixels clue prior to deriving the motion information from the pixels clue, wherein the one or more filters comprise one or more of a guided filter, a bilateral filter, a median filter, a smoothing filter, or an averaging filter.

21. The method of claim 1, wherein determining the pixels clue comprises generating the pixels clue using motion refinement, wherein motion refinement comprises one or more of bi-directional optical flow (BIO), frame-rate up-conversion (FRUC) template matching, or FRUC bilateral matching.

22. The method of claim 1, wherein deriving the motion information comprises deriving the motion information for a first color component of the current block, and wherein determining the pixels clue comprises generating the pixels clue using the first color component and a second color component.

23. The method of claim 1, wherein determining the pixels clue comprises generating the pixels clue to have a size greater than a size of the current block, wherein when a size of the current block is M×N, where M and N are integer values, generating the pixels clue comprises generating the pixels clue from (M+I)×(N+J) motion compensated blocks, wherein I and J are integer values.

24. The method of claim 1, wherein decoding the current block comprises:
predicting the current block using the motion information to form a predicted block;
decoding quantized transform coefficients of the current block;
inverse quantizing the quantized transform coefficients to produce transform coefficients;
inverse transforming the transform coefficients to produce a block of residual data; and
combining the predicted block and the block of residual data to form a decoded block.

25. The method of claim 1, further comprising encoding the current block prior to decoding the current block.

26. A device for decoding video data, the device comprising:
a memory configured to store video data; and
a video decoder implemented in circuitry and configured to:
determine that motion information of a current block of the video data is to be derived using decoder-side motion vector derivation (DMVD);
determine a pixels clue for the current block, the pixels clue comprising pixel data obtained from one or more groups of previously decoded pixels;
determine an inter-prediction direction for the motion information according to matching costs between different prediction directions, wherein the video decoder is configured to scale weighting costs associated with uni-prediction up by a scaling factor;
derive the motion information for the current block according to DMVD from the pixels clue, wherein the video decoder is configured to derive the motion information according to DMVD such that the motion information has the determined inter-prediction direction; and
decode the current block using the motion information.

27. The device of claim 26, wherein the video decoder is configured to generate the pixels clue using multiple hypothesis predictions from multiple motion compensated blocks.

28. The device of claim 26, wherein the pixels clue comprises pixel data obtained from a first block of a first reference picture and a second block of a second reference picture, wherein the first reference picture is different than the second reference picture, and wherein to derive the motion information, the video decoder is configured to:
calculate a matching cost between the first block and the second block, wherein to calculate the matching costs, the video decoder is configured to:

apply a first weight to a first cost measurement for a first set of corresponding pixels of the first block and the second block; and apply a second weight, different from the first weight, to a second cost measurement for a second set of corresponding pixels of the first block and the second block; and refine the motion information based on the matching cost.

29. The device of claim 26, wherein the video decoder is further configured to determine that a motion vector of the motion information derived using DMVD differs from other motion vector candidates in a motion vector candidate list for the current list by a threshold prior to decoding the current block using the motion information.

30. The device of claim 26, further comprising a video encoder including the video decoder, the video encoder implemented in circuitry.

31. The device of claim 26, further comprising a display configured to display the decoded video data.

32. The device of claim 26, wherein the device comprises one or more of a camera, a computer, a mobile device, a broadcast receiver device, or a set-top box.

33. A device for decoding video data, the device comprising:

means for determining that motion information of a current block of video data is to be derived using decoder-side motion vector derivation (DMVD);

means for determining a pixels clue for the current block, the pixels clue comprising pixel data obtained from one or more groups of previously decoded pixels;

means for determining an inter-prediction direction for the motion information according to matching costs between different prediction directions, wherein the means for determining the inter-prediction direction comprises means for scaling weighting costs associated with uni-prediction up by a scaling factor;

means for deriving the motion information for the current block according to DMVD from the pixels clue, wherein the means for deriving the motion information comprises means for deriving the motion information according to DMVD such that the motion information has the determined inter-prediction direction; and means for decoding the current block using the motion information.

34. The device of claim 33, wherein the means for determining the pixels clue comprises means for generating the pixels clue using multiple hypothesis predictions from multiple motion compensated blocks.

35. The device of claim 33, wherein the pixels clue comprises pixel data obtained from a first block of a first reference picture and a second block of a second reference picture, wherein the first reference picture is different than the second reference picture, and wherein the means for deriving the motion information comprises:

means for calculating a matching cost between the first block and the second block, wherein the means for calculating the matching costs comprises:

means for applying a first weight to a first cost measurement for a first set of corresponding pixels of the first block and the second block; and means for applying a second weight, different from the first weight, to a second cost measurement for a second set of corresponding pixels of the first block and the second block; and means for refining the motion information based on the matching cost.

36. A non-transitory computer-readable storage medium having stored thereon instructions that, when executed, cause a processor to:

determine that motion information of a current block of video data is to be derived using decoder-side motion vector derivation (DMVD);

determine a pixels clue for the current block, the pixels clue comprising pixel data obtained from one or more groups of previously decoded pixels;

determine an inter-prediction direction for the motion information according to matching costs between different prediction directions, wherein the instructions that cause the processor to determine the inter-prediction direction comprise instructions that cause the processor to scale weighting costs associated with uni-prediction up by a scaling factor;

derive the motion information for the current block according to DMVD from the pixels clue, wherein the instructions that cause the processor to derive the motion information comprise instructions that cause the processor to derive the motion information according to DMVD such that the motion information has the determined inter-prediction direction; and decode the current block using the motion information.

37. The non-transitory computer-readable storage medium of claim 36, wherein the instructions that cause the processor to determine the pixels clue comprise instructions that cause the processor to generate the pixels clue using multiple hypothesis predictions from multiple motion compensated blocks.

38. The non-transitory computer-readable storage medium of claim 36, wherein the pixels clue comprises pixel data obtained from a first block of a first reference picture and a second block of a second reference picture, wherein the first reference picture is different than the second reference picture, and wherein the instructions that cause the processor to derive the motion information comprise instructions that cause the processor to:

calculate a matching cost between the first block and the second block, wherein the instructions that cause the processor to calculate the matching costs comprise instructions that cause the processor to:

apply a first weight to a first cost measurement for a first set of corresponding pixels of the first block and the second block; and apply a second weight, different from the first weight, to a second cost measurement for a second set of corresponding pixels of the first block and the second block; and refine the motion information based on the matching cost.

* * * * *